(12) United States Patent
Kataoka et al.

(10) Patent No.: US 8,608,359 B2
(45) Date of Patent: Dec. 17, 2013

(54) MOBILE TERMINAL HAVING A LIGHT SOURCE AND A LIGHT REFLECTOR WITHIN THE MOBILE TERMINAL TO ILLUMINATE THE MOBILE TERMINAL

(75) Inventors: Eiji Kataoka, Yokohama (JP); Kenichi Ozasa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 785 days.

(21) Appl. No.: 12/363,654

(22) Filed: Jan. 30, 2009

(65) Prior Publication Data

US 2009/0196048 A1  Aug. 6, 2009

(30) Foreign Application Priority Data

Jan. 30, 2008 (JP) ................................. 2008-019840
Jan. 30, 2008 (JP) ................................. 2008-019847
Apr. 25, 2008 (JP) ................................. 2008-116399

(51) Int. Cl.
*F21V 7/04* (2006.01)

(52) U.S. Cl.
USPC ..... 362/551; 362/555; 362/23.16; 362/23.17; 362/23.09; 362/23.1

(58) Field of Classification Search
USPC ........ 362/135–136, 555, 560, 88, 104, 23.09, 362/23.1, 551, 612–613, 609; 446/175, 219
See application file for complete search history.

(56) References Cited

U.S. PATENT DOCUMENTS

| | | | |
|---|---|---|---|
| 3,720,018 A * | 3/1973 | Peterson et al. | 446/47 |
| 4,992,704 A * | 2/1991 | Stinson | 315/312 |
| 6,435,690 B1 * | 8/2002 | Till | 362/88 |
| 7,336,980 B1 | 2/2008 | Kaikuranta et al. | |
| 7,360,941 B2 * | 4/2008 | Yoon et al. | 362/632 |
| 7,421,269 B2 | 9/2008 | Kostiainen et al. | |
| 7,534,010 B2 * | 5/2009 | Yeh et al. | 362/241 |
| 2007/0105604 A1 | 5/2007 | Choo et al. | |
| 2007/0298851 A1 | 12/2007 | Yamazaki et al. | |
| 2008/0037771 A1 | 2/2008 | Black et al. | |
| 2009/0027874 A1 * | 1/2009 | Chang | 362/88 |

FOREIGN PATENT DOCUMENTS

| | | |
|---|---|---|
| JP | 2004-354731 | 12/2004 |
| JP | 2005-303660 | 10/2005 |
| JP | 2007-068004 | 3/2007 |

* cited by examiner

*Primary Examiner* — Robert May
(74) *Attorney, Agent, or Firm* — Duane Morris LLP

(57) ABSTRACT

A mobile terminal includes a first base having a first light transmission part, the first light transmission part is configured to transmit light from an inside to an outside of the first base. A light source is arranged inside the first base and in a location capable of emitting the light to the outside of the first base via the first light transmission part. A light reflector is arranged outside the first base and in a location corresponding to the first light transmission part, and the first light reflector has a greater strength than that of the first base.

17 Claims, 20 Drawing Sheets

Fig. 3
(a)
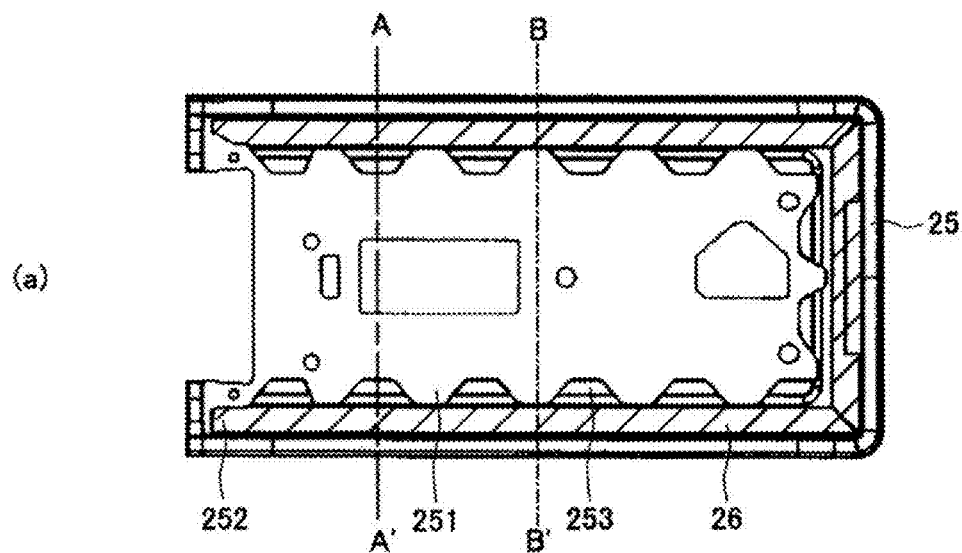
(b)
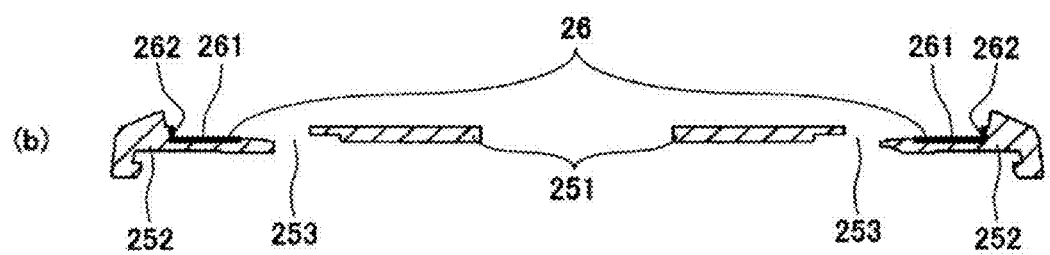
(c)
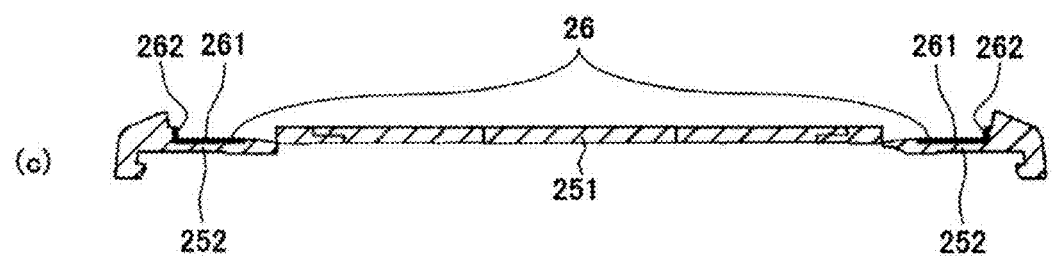

Fig. 9
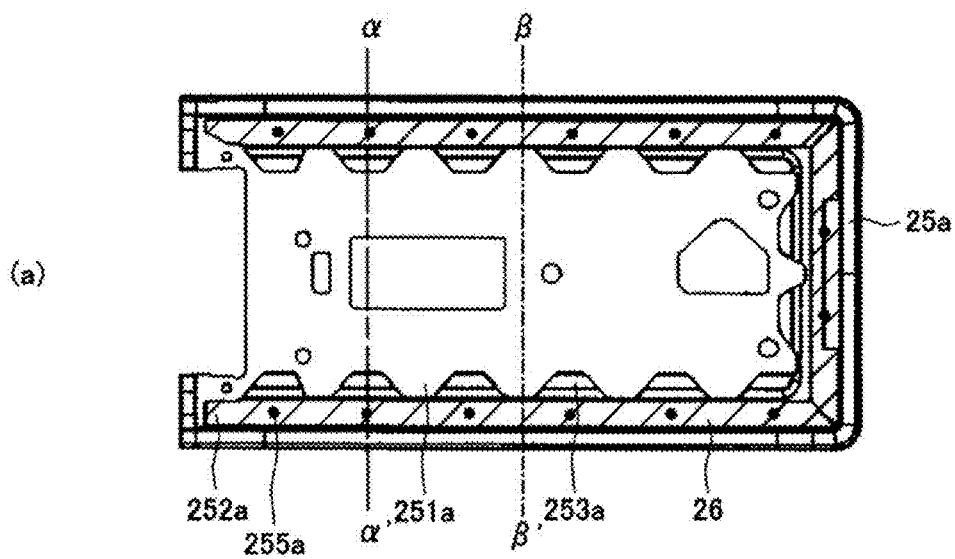
(a)
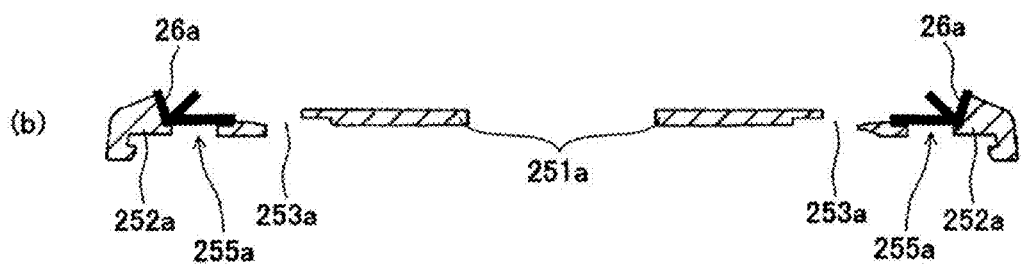
(b)
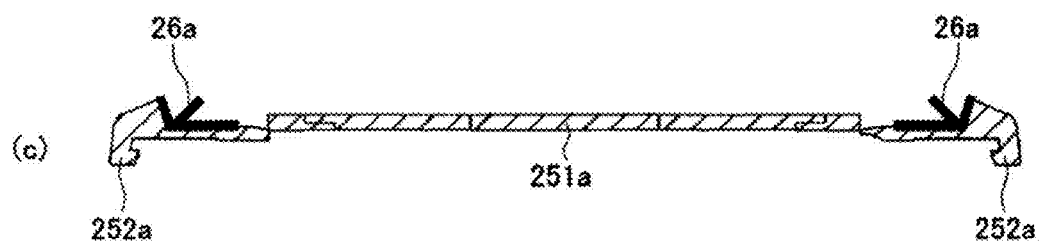
(c)

Fig. 10
(a) 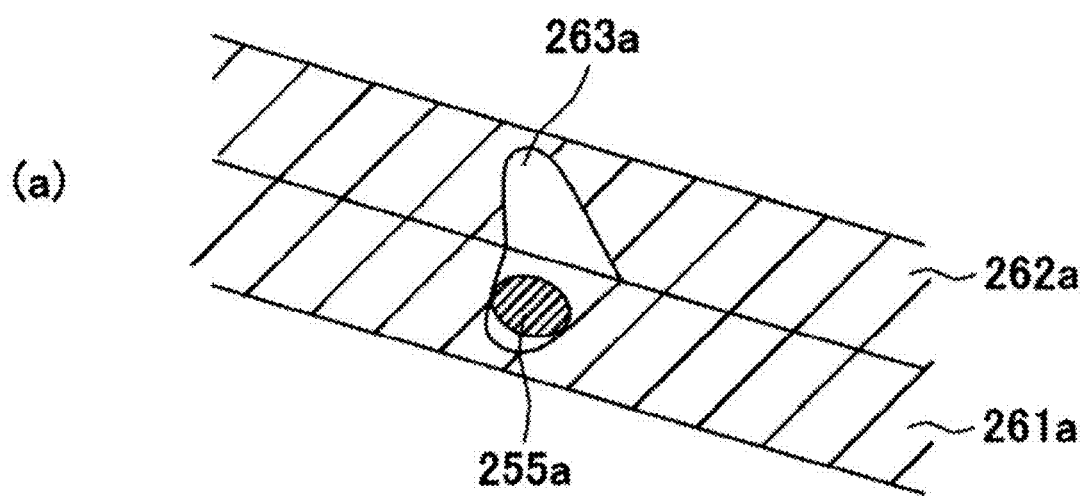
(b) 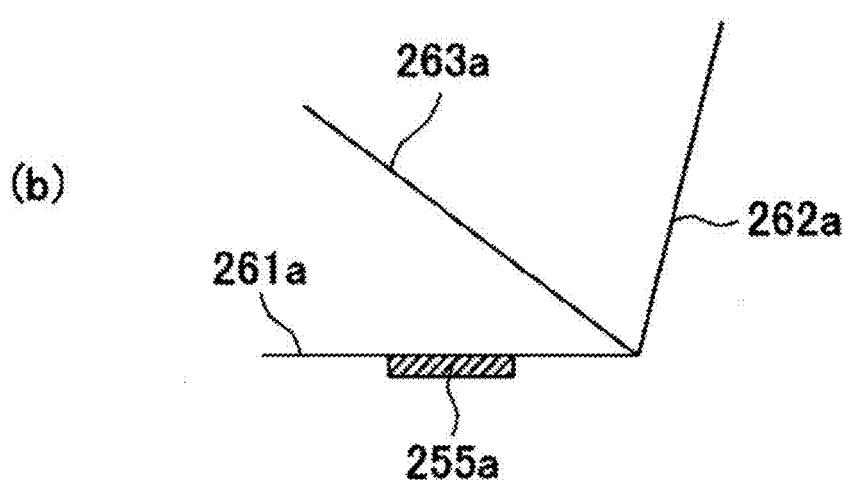

Fig. 15
(a)
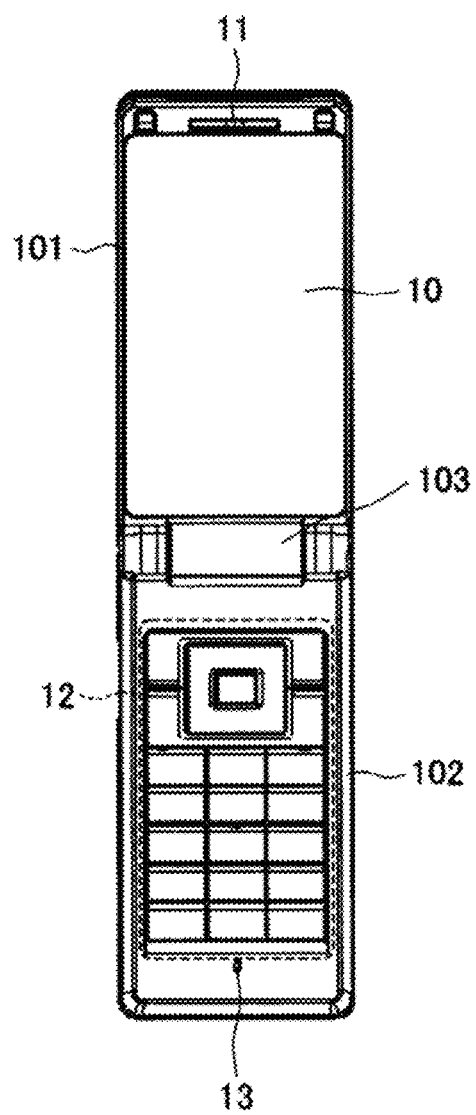
(b)
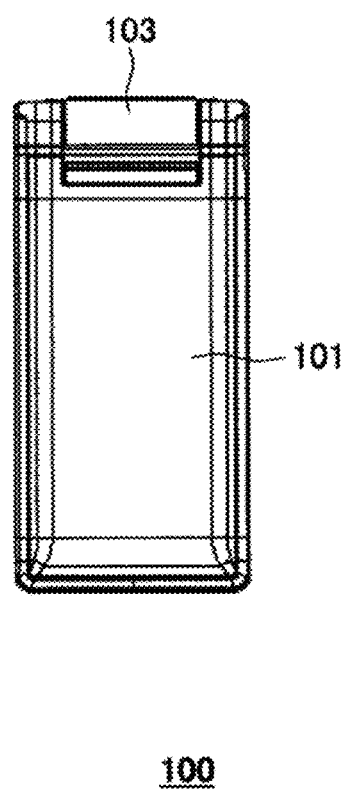

Fig. 17
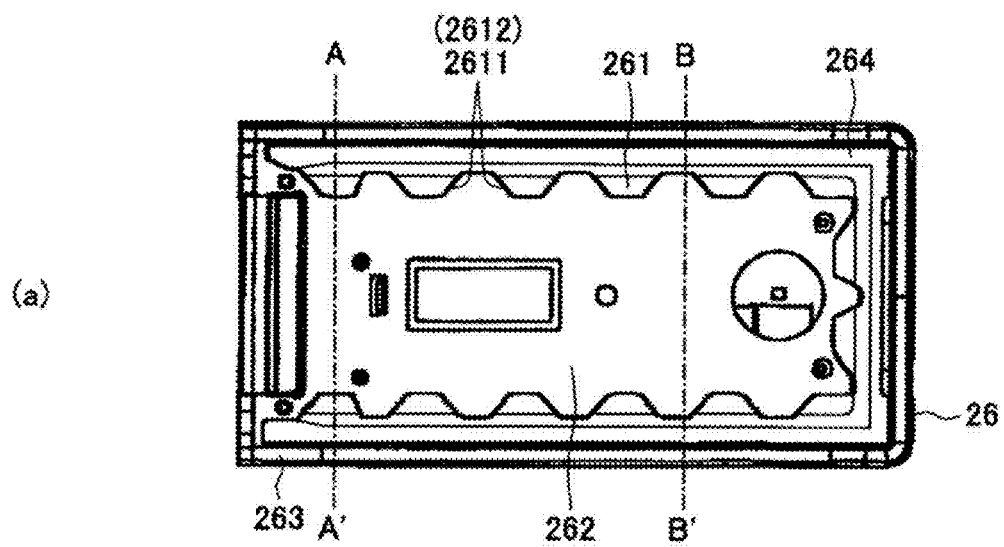
(a)
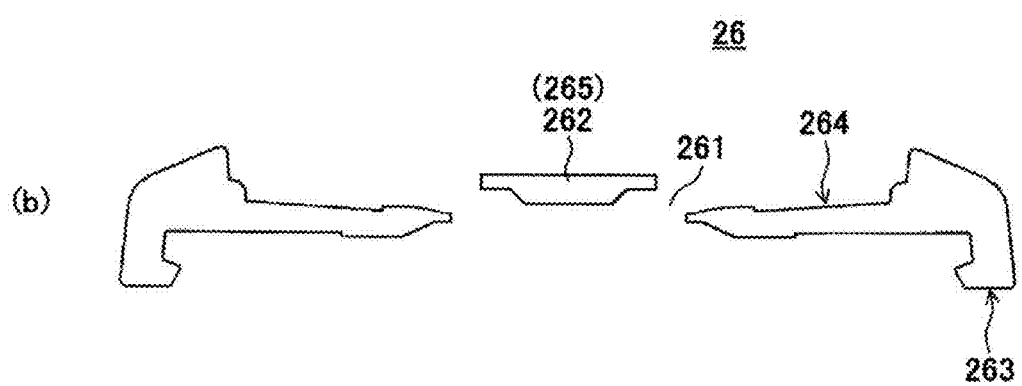
(b)
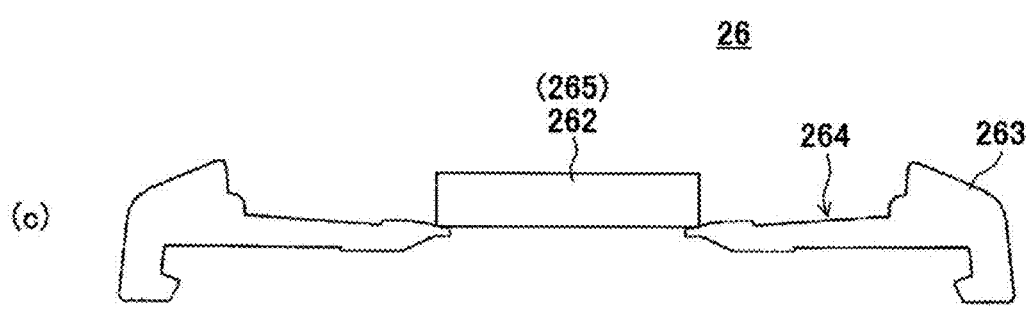
(c)

MOBILE TERMINAL HAVING A LIGHT SOURCE AND A LIGHT REFLECTOR WITHIN THE MOBILE TERMINAL TO ILLUMINATE THE MOBILE TERMINAL

CROSS-REFERENCE TO RELATED APPLICATIONS

The present application claims priority under 35 U.S.C. §119 to Japanese Patent Application No. 2008-019840, filed Jan. 30, 2008, Japanese Patent Application No. 2008-019847, filed Jan. 30, 2008, and Japanese Patent Application No. 2008-116399, filed Apr. 25, 2008, the contents of each of these applications are incorporated herein by reference in their entirety.

BACKGROUND OF THE INVENTION

1. Field of the Invention

The invention relates to a mobile terminal having a light source for emitting light.

2. Description of the Related Art

A mobile terminal having a light shining construction for shining at least a part of a housing is known.

For example, in Japanese Patent Application Laid-Open No. 2007-68004, a housing shining construction is disclosed including: a housing having an opening on its surface; a substrate arranged to face the opening and covered by the housing; a light source mounted on the substrate; and a light guide plate that is mounted on the substrate and has a light source adjacent section arranged near the light source, and an opening adjacent section arranged correspondingly to the opening near an inner wall of the housing rather than the light source adjacent section. However, according to this mobile terminal disclosed in Japanese Patent Application Laid-Open No. 2007-68004, since the opening for radiating light outside is provided in the housing, the strength of the housing may be disadvantageously reduced.

In addition, Japanese Patent Application Laid-Open No. 2007-68004 also discloses a mobile terminal including a housing having an opening on its surface, a circuit board covered by the housing and arranged to face the opening; a light irradiation section mounted on the circuit board; and an optical diffusion section mounted on the circuit board near the light irradiation section. However, according to the mobile terminal disclosed in Japanese Patent Application Laid-Open No. 2007-68004, since the light emitted from the light irradiation section is emitted from the entire opening to the outside of the housing, the opening of the housing should be formed on the basis of a location, size, or range for radiating the light. Therefore, design freedom may be disadvantageously degraded.

SUMMARY OF THE INVENTION

The exemplary embodiments described herein are directed to solving one or more of the problems presented in the prior art, as described above, as well as providing additional features that will become readily apparent by reference to the following detailed description when taken in conjunction with the accompanying drawings.

According to an aspect of the invention, there is provided a mobile terminal capable of emitting light to an outside of a housing while preventing reduction of the strength of the housing that may be caused by formation of the opening.

According to another aspect of the invention, there is provided a mobile terminal capable of emitting light from a desired area to an outside of a housing while preventing degradation of design freedom that may be caused by formation of the opening.

In one embodiment, a mobile terminal includes a first base having a first light transmission part, the first light transmission part is configured to transmit light from an inside to an outside of the first base. The mobile terminal may further include a light source arranged inside the first base and in a location capable of emitting the light to the outside of the first base via the first light transmission part, and a light reflector arranged outside the first base and in a location corresponding to the first light transmission part. According to certain embodiments, the first light reflector may have a higher strength than that of the first base.

In another embodiment, a mobile terminal includes a base having an opening to transmit light from an inside to an outside of the base, a casing member having a first light transmission part configured to transmit light and a first light blocking part configured to block light, where the casing member covers the opening from outside the base. The mobile terminal may further include a first light reflector located between the opening and the first light transmission part; and a light source inside the base configured to emit the light to an outside of the base via the first light transmission part.

BRIEF DESCRIPTION OF THE DRAWINGS

The present disclosure, in accordance with one or more embodiments, is described in detail with reference to the following figures. The drawings are provided for purposes of illustration only and merely depict typical or exemplary embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

FIGS. 3A, 3B, and 3C illustrate a rear case and a sheet metal member according to one embodiment;

FIGS. 9A, 9B, and 9C illustrate the rear case 25a and the sheet metal member 26a according to one embodiment;

FIGS. 10A and 10B illustrate an exemplary shape of a sheet metal member according to one embodiment;

FIGS. 15A and 15B illustrate an example of the appearance of a mobile terminal, according to one embodiment;

FIGS. 17A, 17B and 17C illustrate a shape of the rear case, according to one embodiment;

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

The word "exemplary" is used herein to mean "serving as an example or illustration." Any aspect or design described herein as "exemplary" is not necessarily to be construed as preferred or advantageous over other aspects or designs.

Hereinafter, a mobile terminal according to an embodiment of the invention will be described. The mobile terminal according to an embodiment of the invention is assumed to be a folder-type mobile phone for exemplary purposes; however, various types of mobile terminals may be used without departing from the scope of the present invention.

Figure 1:
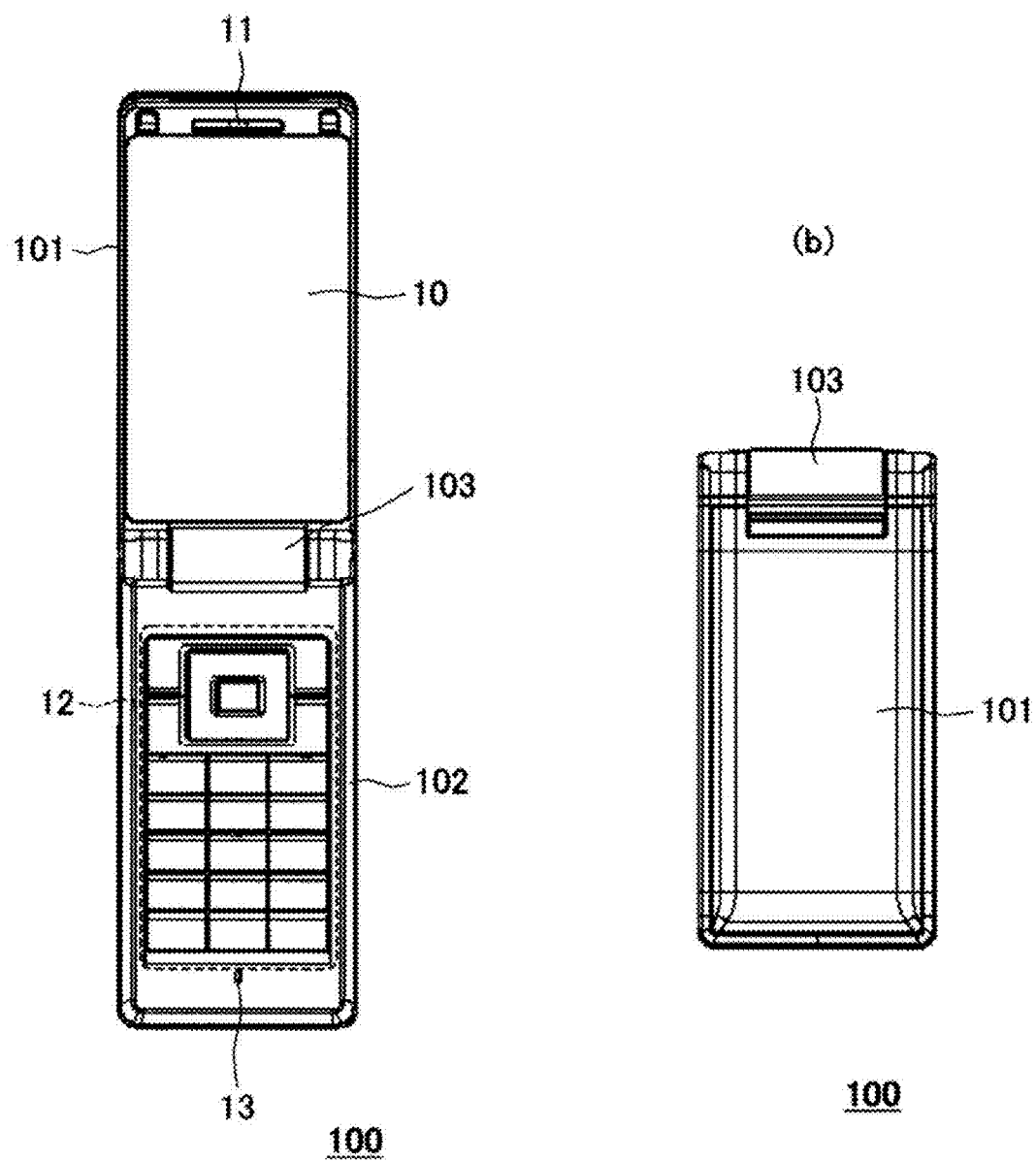
FIGS. 1A and 1B illustrate an example of the appearance of a mobile terminal, according to one embodiment.

FIGS. 1A and 1B are diagrams illustrating an example of the appearance of a mobile terminal 100 according to one embodiment. Specifically, FIG. 1A illustrates an unfolded state (i.e., opened state) of the mobile terminal 100, and FIG. 1B illustrates a folded state (i.e., closed state) of the mobile terminal 100. Referring to FIGS. 1A and 1B, the mobile terminal 100 includes a display unit 10, a first housing 101 provided with a display unit 10 and a speaker 11, and a second housing 102 provided with an operation unit 12 and a microphone 13. The first and second housings 1 and 102 are coupled to each other by way of a hinge 103. The hinge 103 has a hinge mechanism for allowing the first and second housings 101 and 102 to be pivoted against each other. The hinge 103 allows the first and second housings 101 and 102 to transition between the unfolded and folded states shown in FIGS. 1A and 1B, respectively, of the mobile terminal 100. Furthermore, the first housing 1 has a light-emitting construction for allowing at least a part of the exposed surface to emit a light.

Now, a construction of the exemplary first housing 101 will be described.

Figure 2:
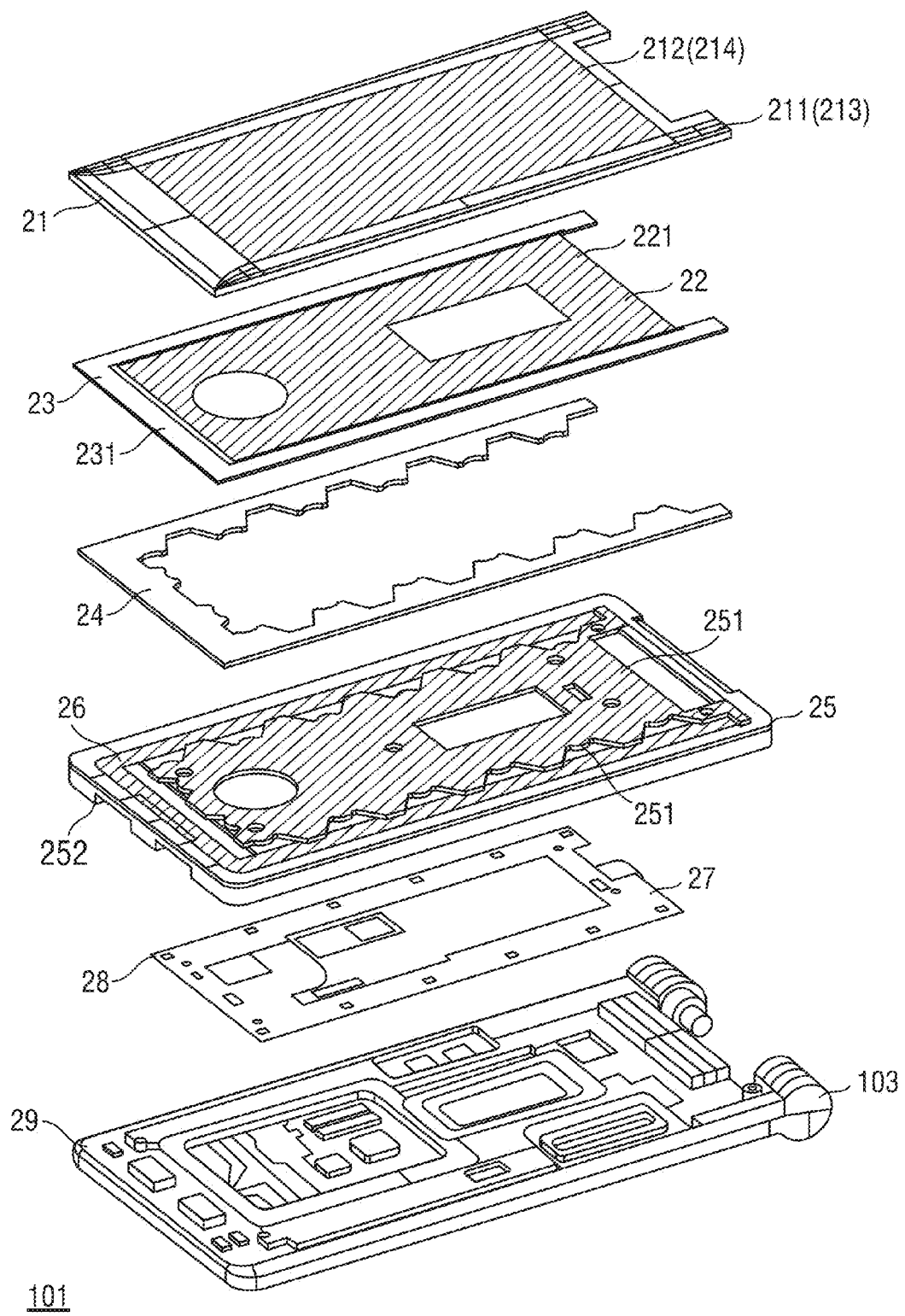
FIG. 2 is an exploded perspective view illustrating a light-emitting construction of a first housing according to one embodiment.

FIG. 2 is an exploded perspective view illustrating the first housing 101. In FIG. 2, a reference numeral 21 denotes a face outwardly exposed when the mobile terminal 100 is in a closed state, and a reference numeral 29 denotes a face obstructed by the second housing 102 when the mobile terminal 100 is in a closed state.

Referring to FIG. 2, the first housing 101 has a stack structure including a rear plate 21, a double-sided adhesive tape 22, a double-sided adhesive tape 23, a light guide 24 (corresponding to the first light guide of the claim), a rear case 25, a sheet metal member 26 (corresponding to the first light reflector of the claim), a flexible substrate 27 having an LED (Light Emitting Diode) 28 (corresponding to a light source of the claim), and a front case 30. A combination of the rear case 25 and the flexible substrate 27 corresponds to the first base of the claim. In addition, while inside the first housing 101, various components such as electronic components for controlling operation of a display unit 1 or a speaker 11 are interposed between the rear and front case 25 and 30 (more specifically, between the flexible substrate 27 and the front case 30), description of these components will be omitted in the first embodiment. In addition, according to the present embodiment, while a sheet metal member 26 is exemplified as the first light reflector, the first light reflector may be formed using materials other than metal if it can provide a higher strength level than that of the first base. It should be noted that a member having a higher strength level is not apt to be deformed by an external force, and the strength level is evaluated by parameters such as a tensile strength or a bending strength.

The rear plate 21 is a plate member made of, for example, reinforced glass or resin. The rear plate 21 is outwardly exposed for the closed state of the mobile terminal 100 and attached to the rear case 25 by way of the double-sided adhesive tape 22 and 23 to provide a main surface of the first housing 101. In addition, according to the first embodiment, an end region 211 and a center region 212 are separately provided in the rear plate 21. The double-sided adhesive tape 22 is provided such that an outer face of the first housing 101 is attached to the center region 212 of the rear plate 21, and an inner face of the first housing 101 is attached to the center region 251 of the rear case 25. In addition, the shape and size of the double-sided adhesive tape 22 are substantially equal to those of the center region 212 of the rear plate 21.

Similarly, the double-sided adhesive tape 23 is provided such that an outer face of the first housing 101 is attached to the end region 211 of the rear plate 21, and the inner face of the first housing 101 is attached to the light guide 24. Also, the shape and size of the double-sided adhesive tape 23 are substantially equal to those of the end region 211 of the rear plate 21.

The light guide 24 is an optical diffusion member made of a transparent member or resin having a high optical diffusion rate such as polycarbonate. The light guide 24 is arranged in the rear case 25 by attaching the outer face of the first housing 101 to the rear case 25 using the double-sided adhesive tape 23. Since the light guide 24 is arranged in the rear case 25 to face the LED 28 in a width direction of the first housing 101, the light guide 24 is interposed between the LED 28 and the sheet metal member 26 which will be described later. In addition, the size of the light guide 24 is substantially equal to that of end region 211 of the rear plate 21.

The rear case 25 is a case structure made of resin or the like and fitted into the edges of the front case 30 to provide appearance of the first housing 101. In addition, the rear case 25 has a plurality of openings 253 to separate a center region 251 and an end region 252 from each other. The sheet metal member 26 is a metallic plate-shape member disposed in an end region 252 of the rear case 25. The sheet metal member 26 is preferably made of a sort of metal having a high optical diffusion rate, a high reflectance, and a high rigidity level such as copper.

Now, the rear case 25 and the sheet metal member 26 will be described in more detail. FIGS. 3A, 3B, and 3C are diagrams for describing the rear case 25 and the sheet metal member 26. FIG. 3A is a front view illustrating a rear case 25 viewed from an outer front side of the first housing 101, FIG. 3B is a width cross-sectional view illustrating a rear case 25 along a line A-A' of FIG. 3A, and FIG. 3C is a cross-sectional view along a line B-B' of FIG. 3A. Referring to FIG. 3A, the rear case 25 includes a plurality of openings 253 (corresponding to the first light transmission part of the claim), a center region 251, and an end region 252. Further, a sheet metal member 26 is arranged on the end region 252.

A plurality of the openings 253 of the rear case 25 are opened to transmit the light emitted from the LED 28. The number of the openings 253 is set to be the same as the number of the LEDs 28. As shown in FIG. 3A, the openings 253 generally have a trapezoidal shape as viewed from the outer front face of the first housing 11. In addition, as shown in FIG. 3B, the openings 253 are opened between the center region 251 and the end region 252.

The center region 251 is a member constructed near a center area of the rear case 25, and is constituted as a light blocking part 254 for blocking the light emitted from the LEDs 28 to prevent leakage from areas other than the openings 253. The center region 251 has a step structure which is higher than the end region 252 which will be described later. FIG. 3C is a cross-sectional view along a line B-B' of FIG. 3A. As shown in FIG. 3C, the rear case 25 is obtained by coupling the center region 251 and the end region 252 to each other. As shown in FIGS. 3A to 3C, the end region 252 forms an edge (i.e., end) area of the rear case 25. As shown in FIG. 3C, since the center region 251 and the end region 252 are coupled to each other in an area where the openings 253 are not provided, the light blocking part 254 constructed by the center region 251 is terminated such that the light emitted from the LEDs 28 is not leaked from an area other than the openings 253.

A sheet metal member 26 is provided on the end region 252. As shown in FIG. 3A, the sheet metal member 26 is arranged on the end region 252 such that the end region 252 is exposed from the outer face of the first housing 101. In addition, the sheet metal member 26 may be formed integrally with the end region 252 by an injection molding in a mold of the end region 252. As shown in FIGS. 3B and 3C, the sheet metal member 26 has a first surface 261 parallel to the first housing 101 in width and longitudinal directions and a second surface 262 parallel to the first housing 101 in thickness and longitudinal directions, and is bent in an L-shape. In addition, although not shown in the drawings, the sheet metal member 26 is electrically connected to a ground pattern (not shown) which is a reference voltage formed on, for example, a flexible substrate 27, and constructed to serve as a reference voltage. As a result, it is possible to remove electric and magnetic noises around the rear case 25 and the sheet metal member 26.

The flexible substrate 27 is a circuit board for performing various kinds of control operation in response to control of a controller unit (not shown in FIG. 2). According to the first embodiment, since a plurality of LEDs 28 are mounted on an outer face of the first housing 101, the flexible substrate 27 has a circuit for transmitting control signals from the controller unit to each LED 28 or a ground pattern. Therefore, the flexible substrate 27 is internally arranged in the first housing 101 such that each of the LEDs 28 corresponds to each of the openings 253 of the rear case 25. In addition, the controller unit (not shown in the drawings) is adapted to allow a part of the LEDs 28 as well as all of the LEDs 28 to be partly or simultaneously turned on. The LEDs 28 are constructed of light-emitting diodes or the like to serve as a light source.

Figure 4:
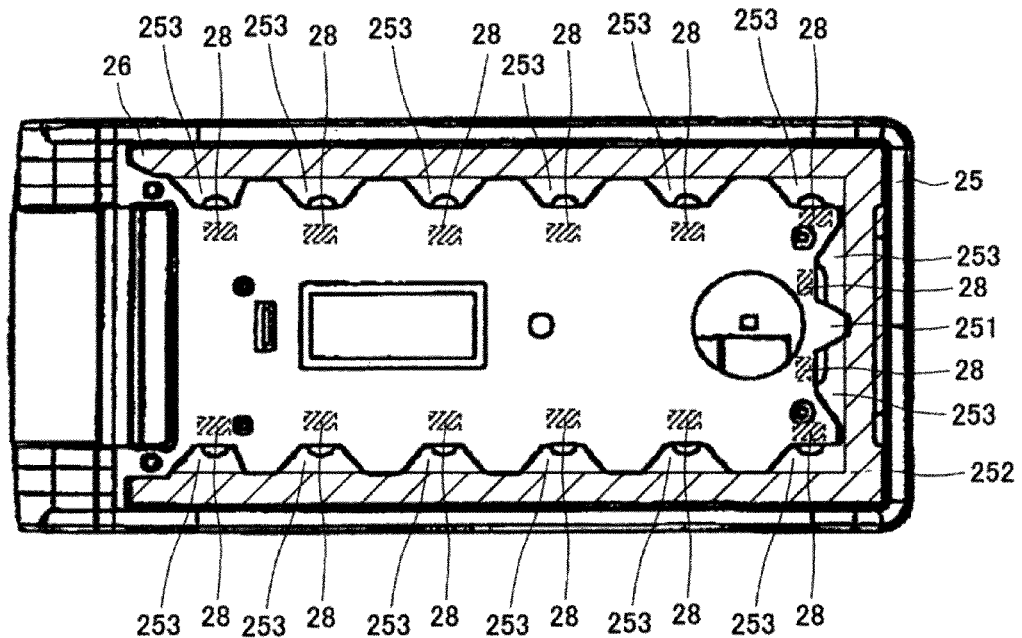
FIG. 4 illustrates how the openings and a plurality of the LEDs mounted on the flexible substrate are arranged correspondingly to each other according to one embodiment as viewed from an outer front face of the first housing of the rear case.

FIG. 4 is a diagram illustrating how the openings 253 and a plurality of the LEDs 28 are mounted on the flexible substrate 27 correspondingly to each other as viewed from an outer front face of the first housing 101 of the rear case 25. In addition, since the LEDs 28 are disposed in an inside of the center region 251 of the rear case 25, it is difficult to recognize the LEDs 28 as the rear case 25 is viewed from an outer front face of the first housing 1 of the rear case 25. Accordingly, in FIG. 4, the LEDs 28 are illustrated as boxes surrounded by dotted lines.

Figure 5:
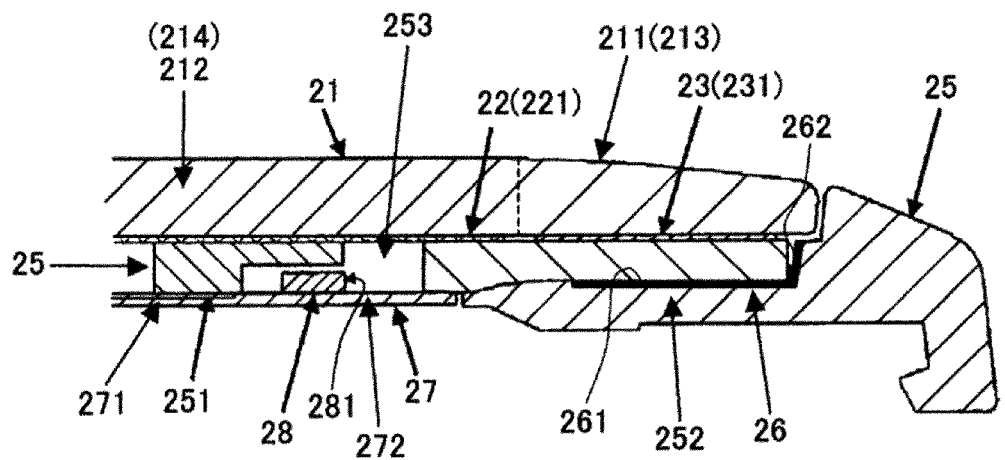
FIG. 5 is a cross-sectional view along a line passing through one of a plurality of LEDs in a width direction of the first housing according to one embodiment.

FIG. 5 is a cross-sectional view along a line passing through one of a plurality of LEDs 28 in a width direction of the first housing 101. Referring to FIG. 5, a light guide 24 is arranged on an outer face of the first housing 101 in the end region 252 of the rear case 25. In addition, the rear plate 21 is arranged on an outer face of the first housing 101 in the rear case 25 by way of the double-sided adhesive tapes 22 and 23. That is, in the rear plate 21, the center region 212 is attached to the center region 251 of the rear case 25, and the end region 211 is attached to the double-sided adhesive tape 23 which is also attached to the outer face of the first housing 101 in the light guide 24, so that end region 211 is arranged on an outer face of the first housing 101 in the rear case 25.

The center region 212 of the rear plate 21 is made of a member having a low light transmittance rate (e.g., a member colored by a black color group having a low light transmittance rate) to provide a light blocking part 214. In addition, the double-sided adhesive tape 22 attached to it is also made of a member having a low light transmittance rate (e.g., a member colored by a black color group) to provide a light blocking part 221. On the other hand, the end region 211 of the rear plate 21 is made of a member having a high light transmittance rate (e.g., a transparent or semitransparent member) to provide an light transmission part 213. In addition, the double-sided adhesive tape 23 attached to the end region 211 is also made of a member having a high light transmittance rate (e.g., a transparent or semitransparent member) to provide an light transmission part 231.

On the other hand, the flexible substrate 27 is arranged inside the rear case 25 to provide a facing section 271 opposite to the inner face of the first housing 101 in the center region of the rear case 25 and an extension 272 extended to the opening 253 formed in the rear case 25. In addition, LEDs 28 are mounted on an outer face of the first housing 101 in the extension 272. Specifically, the LEDs 28 are mounted on the extension 272 of the flexible substrate 27 such that the light irradiation surface 281 is directed in a width direction of the first housing 101 where the light is practically emitted, i.e., toward the end region 252 from the center region 251 of the rear case 25.

Figure 6:
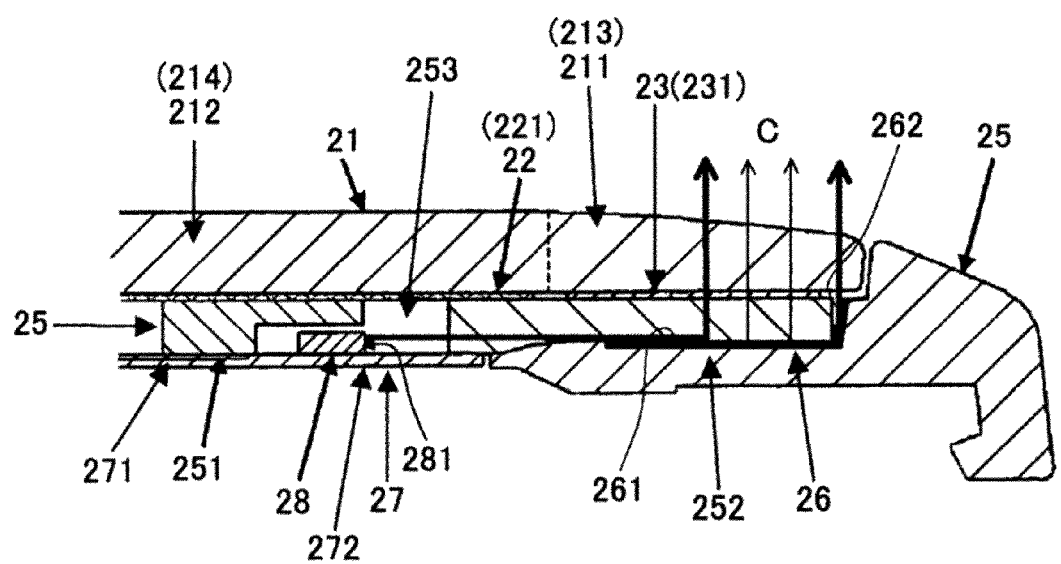
FIG. 6 illustrates a path for passing the light emitted from the LED 28 according to one embodiment.

Now, a path for passing the light emitted from the LEDs 28 will be described with reference to FIG. 6. Similarly to FIG. 5, FIG. 6 is a cross-sectional view along a line passing through one of the LEDs 28 in a width direction of the first housing 101. Referring to FIG. 6, since the irradiation surface 281 of the LED 28 is mounted on the extension 272 of the flexible substrate 27 toward the width direction (i.e., a horizontal direction) of the first housing 101, the light emitted from the LED 28 is efficiently incident to the light guide 24 opposite to the irradiation surface 281 of the LED 28. Therefore, the light incident to the light guide 24 reaches the sheet metal member 26 while being diffused into the light guide 24. Since the sheet metal member 26 is made of a metallic material having a high optical diffusion rate and a high reflectance, the light incident to the sheet metal member 26 through the light guide 24 is diffused and reflected by the sheet metal member 26 toward the light transmission part 213 of the rear plate 21, and then incident to the light guide 24 back. Since the sheet metal member 26 has a first surface 261 which is generally perpendicular to the irradiation surface 281 of the LEDs 28 and parallel to width and longitudinal directions of the first housing 101 and a second surface 262 which is generally parallel to the irradiation surface 281 of the LEDs 28 and parallel to thickness and longitudinal directions of the first housing 101, the first surface 261 diffuses the light propagating into the first housing 101, and the second surface 262 diffuses the light propagating into the end region of the first housing 101 without leakage, so that the light incident to the sheet metal member 26 is efficiently input to the light guide 24 back. Therefore, the light directed back to the light guide 24 arrives at the outside of the first housing 101, and as a result, is input to the light transmission part 231 of the double-sided adhesive tape 23. Since the light transmission part 231 is made of a material having a high light transmittance rate as described above, most of the incident light is not blocked but incident to the light transmission part 213 of the rear plate 21. Similarly to the light transmission part 231 of the double-sided adhesive tape 23, since the light transmission part 213 of the rear plate 21 is also made of a material having a high light transmittance rate, most of the light incident to the light transmission part 213 is not blocked and also emitted outside the first housing 101. In addition, although the light incident to the sheet metal member 26 includes the light reflected oppositely to the irradiation direction by the second surface 262, the reflected light also arrives at the outside of the first housing 101 by the first surface 261. Therefore, the light emitted from the LEDs 28 adequately arrives at the outside of the first housing 101.

On the other hand, the light emitted from the irradiation surface 281 of the LEDs 28 includes the light directly emitted to the outside of the first housing 101 without passing through the light guide 24 or the light emitted to the inside of the first housing 101 in addition to the light incident to the light guide 24. However, since the light directly emitted to the outside of the first housing 101 from the LEDs 28 is incident to the center region 212 of the rear plate 21 and the double-sided adhesive tape 22 made of a material having a low light transmittance rate, most of the light is blocked by the light blocking part 221 and the center region 212. In summary, the light emitted from the LEDs 28 is efficiently emitted to the outside of the first housing via a path passing through the light guide 24, the sheet metal member 26, the light guide 24, the double-sided adhesive tape 23, and the light transmission part 213 of the rear plate 21 as shown by an arrow C.

Figure 7:
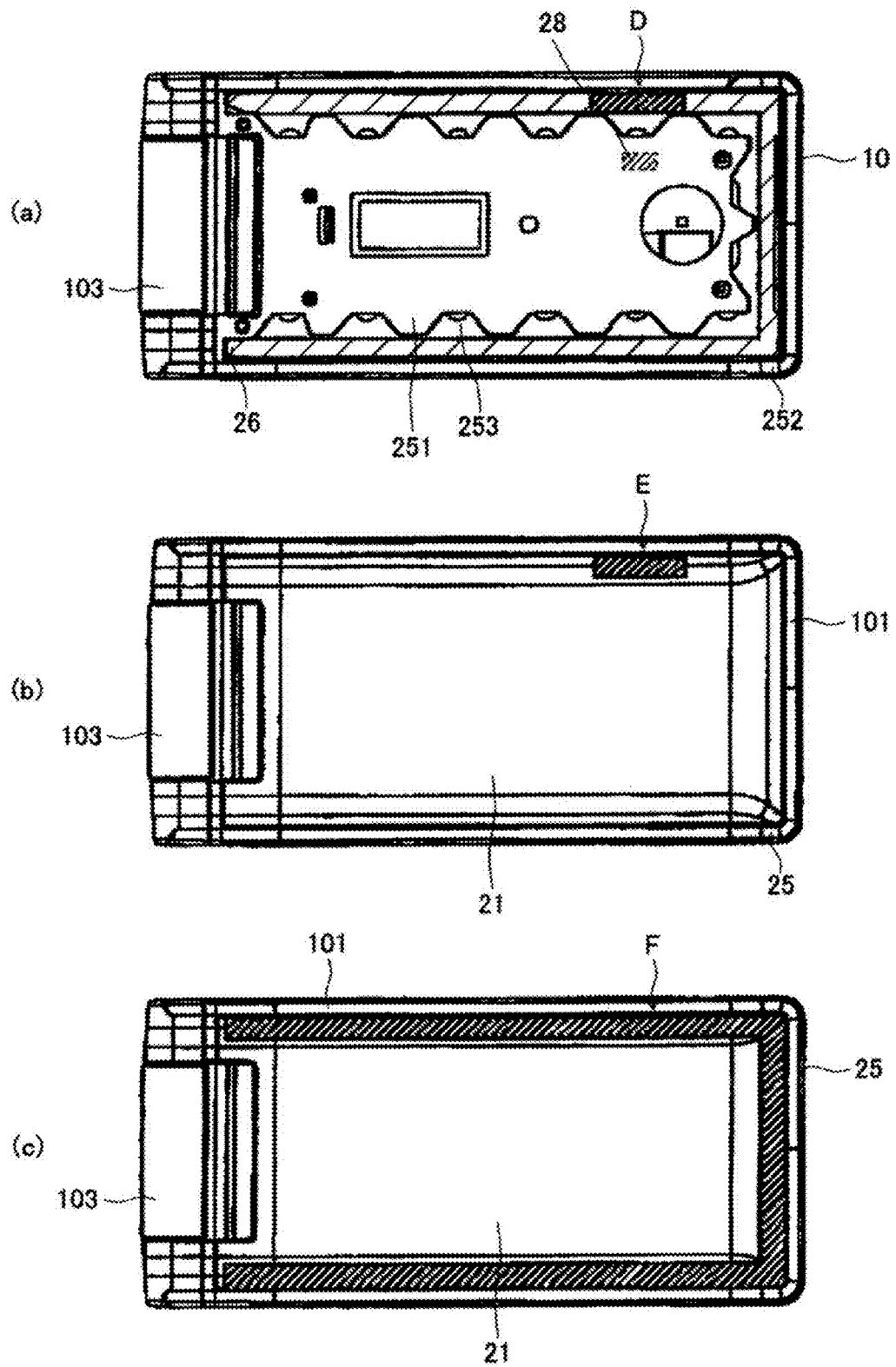
FIGS. 7A, 7B, and 7C illustrate how the light emitted from the LED 28 is seen from the outside of the first housing 101 according to one embodiment.

Now, how the light emitted from the LEDs 28 is recognized from the outside of the first housing 101 will be described. FIGS. 7A, 7B, and 7C illustrate how the light emitted from the LEDs 28 to the outside of the first housing 101 is recognized from the outside. Specifically, FIG. 7A is a front view illustrating a rear case 25 when the light is emitted from a single LED 28 with the rear plate 21 being removed, FIG. 7B is a front view illustrating a rear case 25 when the light is emitted from a single LED 28 with the rear plate 21 being installed, and FIG. 7C is a front view illustrating a rear case 25 when the light is simultaneously emitted from a plurality of LEDs 28 with the rear plate 21 being installed.

Referring to FIG. 7A, since the opening 253 of the rear case 25 is generally formed in a radial shape with respect to the LED 28 by control operation from the controller unit of the flexible substrate 27, the light emitted from, for example, the LED 28a shown in FIG. 7A and diffused in a radial shape by the light guide 24 and the sheet metal member 26 is diffused in a radial shape by the light guide 24 and the sheet metal member 26, and as a result, an area D (filled with slash lines) of FIG. 7A appears to shine brightly from the outer front side of the rear case 25. As to this light, when the rear plate 21 is installed, an area E (filled with slash lines) appears to shine brightly from the outer front side of the rear case 25 as shown in FIG. 7B. On the other hand, as shown in FIG. 7C, when the light is simultaneously emitted from a plurality of LEDs 28 by control operation from the controller unit of the flexible substrate 27, the light emitted from each LED 28 are overlapped to each other. As a result, an area F (filled with slash lines), i.e., the entire area of the light transmission part 213, appears to shine brightly from the outer front side of the rear case 25.

As described above, in the mobile terminal 100 according to the first embodiment, since the sheet metal member 26 made of metal having a high rigidity level is provided on the end region 252 of the rear case 25 having the openings 253 for emitting the light emitted from the LEDs 28 to the outside, it is possible to improve rigidity of the rear case 25 even when the number of the openings 253 is equal to the number of the LEDs 28. In addition, in the mobile terminal 100 according to the first embodiment, since the light emitted from the LEDs 28 is efficiently reflected and diffused via the light guide 24 owing to the sheet metal member 26 which is exposed to the outside of the first housing 101 of the end region 252 and made of metal having a high optical reflectance and a high diffusion rate, it is possible to emit light having a high brightness level to the outside of the first housing 101 by allowing the light reflected and diffused by the sheet metal member 26 to be incident back to the light guide 24 and diffused, and then to be passed through the light transmission parts 231 and 213. In addition, in the mobile terminal 100 of the first embodiment, since the sheet metal member 26 has a first surface 261 which is parallel to the width and longitudinal directions of the first housing 101 and second surface 262 which is parallel to the thickness and longitudinal directions of the first housing 101 so as to provide an L-shape, it is possible to reflect and diffuse the light emitted from the LED 28 into the inside and end directions of the first housing 1 without leakage. Since a metal member generally becomes strong in a bent area, the sheet metal member 26 is bent in an L-shape to further increase the strength of the sheet metal member 26, whereby it is possible to further improve rigidity of the rear case 25. In addition, in the mobile terminal 100 according to the first embodiment, since the sheet metal member 26 is electrically connected to a ground section which is a reference voltage and constructed to serve as a reference voltage, it is possible to remove electric and magnetic noises around the opening 253 which has been known to be susceptible to noises.

According to one embodiment, there is provided a mobile terminal 100a capable of emitting light from a plurality of areas by modifying the mobile terminal 100.

The mobile terminal 100a according to an embodiment has a plurality of the same components as those of the mobile terminal 100 described above.

Figure 8:
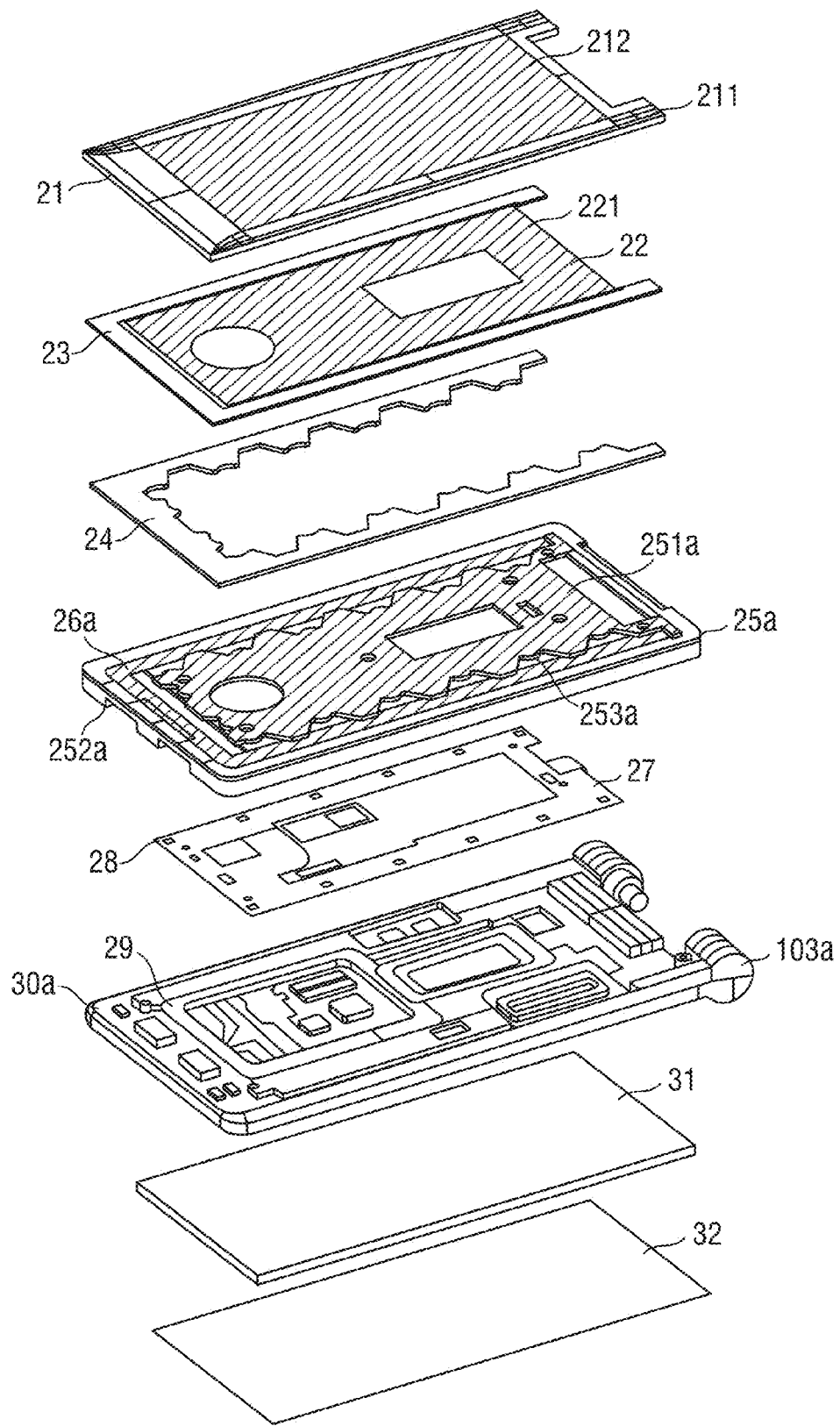
FIG. 8 is an exploded perspective view illustrating an example of a first housing according to one embodiment.

The mobile terminal 100a according to an embodiment includes first and second housings 101a and 102. FIG. 8 is an exploded perspective view illustrating an example of a first housing 101a according to one embodiment. Referring to FIG. 8, the first housing 101a has a stack structure including a rear plate 21, a double-sided adhesive tape 22, a double-sided adhesive tape 23, a light guide 24 (corresponding to the second diffusion member of the claim), a rear case 25a, a sheet metal member 26a (corresponding to the first light reflector of the claim), a flexible substrate 27 having an LED (Light Emitting Diode) 28 (corresponding to a light source of the claim), a circuit board 29 (corresponding to the first circuit board of the claim), a front case 30a (corresponding to the second base of the claim), a liquid crystal display module 31, and a liquid crystal display protection plate 32. A combination of the rear case 25a and the flexible substrate 27 corresponds to the first base of the claim. If a symbol is not denoted in any aforementioned component, it means it has a similar construction to that of the first embodiment, and thus, its detailed description will be omitted.

The rear case 25a is a case structure made of resin or the like and fitted into the edges of the front case 30a to provide appearance of the first housing 101a. The sheet metal member 26a is a metallic plate-shape member disposed in an end region 252a of the rear case 25a which will be described later. The sheet metal member 26 is preferably made of a sort of metal having a high optical diffusion rate, a high reflectance, and a high rigidity level such as copper.

Now, the rear case 25a and the sheet metal member 26a will be described in more detail. FIGS. 9A, 9B, and 9C are diagrams for describing the rear case 25a and the sheet metal member 26a of the embodiment. FIG. 9A is a front view illustrating a rear case 25a viewed from an outer front side of the first housing 101, and FIG. 9B is a width cross-sectional view illustrating a rear case 25a along a line α-α' of FIG. 9A. Referring to FIG. 9A, the rear case 25a includes a center region 251a, an end region 252a, a plurality of openings 253a (corresponding to the first light transmission part of the claim) opened between the center and end regions 251a and 252a, and a plurality of openings 255a opened in the end region 252a.

The center region 251a is a member constructed near a center area of the rear case 25a, and is constituted as a light blocking member 254 for blocking the light emitted from the LED 28 to prevent leakage from areas other than the openings 253a and 254a to the outside of the first housing 101a. The center region 251a has a step structure which is higher than the end region 252a which will be described later. FIG. 9C is a cross-sectional view along a line β-β' of FIG. 9A (in an area where the opening 253a is not opened). As shown in FIG. 9C, the rear case 25a is obtained by coupling the center region 251a and the end region 252a to each other in an area where the opening 253a is not opened.

The end region 252a forms an edge (i.e., end) area of the rear case 25a as shown in FIGS. 9A to 9C. As shown in FIG. 9C, since the center region 251a and the end region 252a are coupled to each other in an area where the openings 253a are not provided, the rear case 25a is terminated such that the light emitted from the LEDs 28 is not leaked from an area other than the openings 253a. The end region 252a has an opening 255a as shown in FIGS. 9B and 9C. The opening 255a is a hole for transmitting the light emitted from the LED 28 to the inside of the first housing 101a and to the front case 30a.

A plurality of the openings 253a are opened between the center and end regions 251a and 252a to transmit the light emitted from the LED 28. The number of the openings 253a provided in the rear case 25a is set to be equal to the number of the LEDs 28. As shown in FIG. 9A, the openings 253a generally have a trapezoidal shape as viewed from the outer front face of the first housing 101a. In addition, as shown in FIG. 9B, the openings 253a are opened between the center region 251a and the end region 252a.

In addition, the sheet metal member 26a is provided near the openings 255a of the end region 252a. FIGS. 10A and 10B show an exemplary shape of a sheet metal member. FIG. 10A is a perspective view illustrating a sheet metal member 26a near any one of openings 255a. Referring to FIG. 10A, the sheet metal member 26a has a first surface 261a parallel to the first housing in width and longitudinal directions and a second surface 262a bent in a predetermined angle with respect to the first surface 261a and in a thickness direction of the housing in an L-shape. In addition, as shown in FIG. 10A, the sheet metal member 26a has a cut-and-erect section 263a in an area corresponding to the opening 255a. The cut-and-erect section 263a is formed by cutting and erecting a region corresponding to the opening 255a of the first surface 261a of the sheet metal member 26a to be larger than the area of the opening 255a. A surface opposite to the opening 255a (the surface viewed in FIG. 10A) is constructed to have a high light reflectance.

FIG. 10B is a cross-sectional view illustrating the sheet metal member 26a in an area corresponding to the opening 255a as viewed from the thickness direction of the first housing 101a. As shown in FIG. 10B, the cut-and-erect section 263a is formed to cover the opening 255a.

In this regard, the sheet metal member 26a may be formed integrally with the end region 252a by an injection molding in a mold of the end region 252a.

On the circuit board 29, various electronic components are mounted to implement various functions of the first housing 10a. In the circuit board 29, an opening 291a (corresponding to the third light transmission part of the claim) is opened in a location corresponding to the opening 255a opened in the end region 252a of the rear case 25a. A ground pattern (such as a gold pattern) which is not shown in the drawings is formed around the opening 291a, so that the aforementioned sheet metal member 26a is connected to the ground pattern by way of a conductive member (not shown in the drawings). As a result, it is possible to allow the sheet metal member 26a to serve as a reference voltage.

The front case 30a is a case structure made of resin or the like and fitted into the edges of the rear case 25a to provide the appearance of the first housing 101a. In the front case 30a, an opening 301a (corresponding to the second light transmission part of the claim) is opened in a location corresponding to the opening 255a.

The liquid crystal display module 31 is provided to construct and operate a liquid crystal display of the mobile terminal 100a. The liquid crystal display module 31 is electrically connected to the circuit board 29 and performs display operation under the control of the display controller unit (not shown in the drawings) mounted on the circuit board 29. The liquid crystal protection plate 32 is a plate member for protecting the liquid crystal display module 31 from external impact and is made of resin or the like. The liquid crystal protection plate 32 is made of a material having a high transmittance rate because content displayed on the liquid crystal display module 31 must be transmitted and viewed from the outside.

According to the mobile terminal 100a of an embodiment, the light emitted from the LED 28 arranged inside the first housing 101a is emitted to the outside by way of various components described above. Now, how the light emitted from the LED 28 is emitted to the outside will be described.

Figure 11:
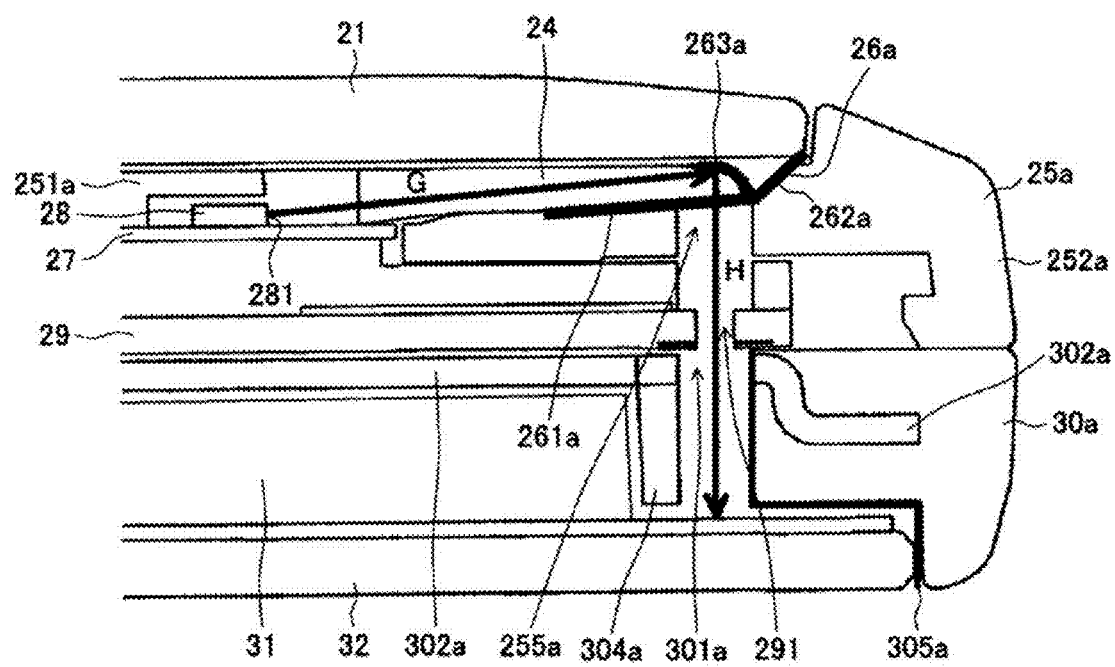
FIG. 11 is a cross-sectional view along a line passing through one of a plurality of the LEDs 28 with respect to the width direction of the first housing according to one embodiment.

FIG. 11 is a cross-sectional view along a line passing through one of a plurality of the LEDs 28 with respect to the width direction of the first housing 101. As shown in FIG. 11, the LED 28 has a light irradiation surface 281 and is mounted on the flexible substrate 27 such that the light irradiation surface 281 of the LED 28 is directed in a width direction of the first housing 101 where the light is practically emitted, i.e., toward the end region 252a from the center region 251a of the rear case 25a. Therefore, the light emitted from the LED 28 is first incident to the light guide 24 arranged on the outer face of the first housing 101 with respect to the end region 252a of the rear case 25a. The light guide 24 guides the light incident from the LED 28 into the sheet metal member 26a as shown by an arrow G of FIG. 11. The lower face of the light guide 24 of FIG. 11 (the inner face of the first housing 101) has an inclined surface extended from the LED 28 to the opening 255a and the sheet metal member 26a. This will allow the light incident to the light guide 24 from the LED 28 to be efficiently propagated to the sheet metal member 26a. The light guided by the light guide 24 arrives at the cut-and-erect section 263a of the sheet metal member 26a. As described above, since the surface of the cut-and-erect section 263a facing the opening 255a is formed to have a high reflectance, the cut-and-erect section 263a reflects the arrived light into the inside of the first housing 101a (as shown as an arrow H of FIG. 11).

The light reflected by the cut-and-erect section 263a arrives at the liquid crystal protection plate 32 via the opening 255a of the rear case 25a, the opening 291 of the circuit board 29, and the opening 301a of the front case 30a as shown in FIG. 11. Since the liquid crystal protection plate 32 is made of a material having a high transmittance rate as described above, the light emitted from the LED 28 is emitted from the surface of the front case 30a (i.e., the surface opposite to the liquid crystal display) of the first housing 101a.

Figure 12:
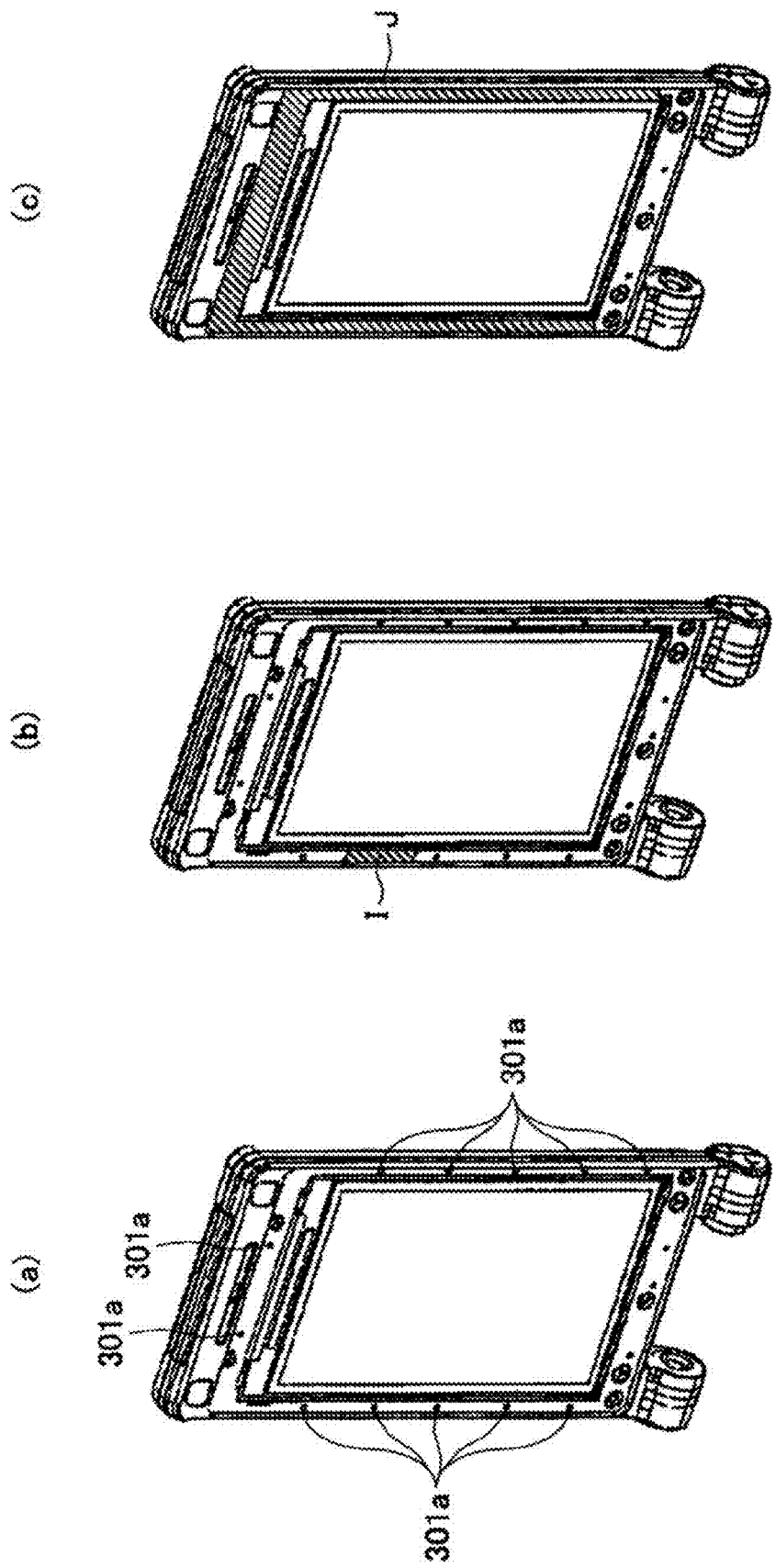
FIGS. 12A, 12B, and 12C illustrate how light is emitted from the front case of the first housing as viewed from the outside of the first housing according to one embodiment.

FIGS. 12A, 12B, and 12C illustrate how the surface of the front case 30 of the first housing 101a emits light. In other words, FIGS. 12A, 12B, and 12C illustrates how light is emitted from the front case 30a of the first housing 101a as viewed from the outside. FIG. 12A is a diagram illustrating a specific example of a location of the opening 301a opened in the front case 30a. As shown in FIGS. 12A, 12B, and 12C, the opening 301a is formed in an area enveloping the liquid crystal display module 31 of the front case 30a. Therefore, when the light emitted from a single LED 28 is emitted from the opening 301a, a part I of periphery of the liquid crystal display unit in the liquid crystal protection plate 32 appears to shine brightly as shown in FIG. 12B. In this regard, the number of the openings 301a is equal to the number of the LEDs 28, so that the light emitted from each LED 28 is emitted from each opening 301a. Therefore, when the light is emitted from all of the LEDs 28, an area J (i.e., substantially the entire periphery of the liquid crystal display unit) appears to shine brightly as shown in FIG. 12C.

In addition, it is not to say that all of the light emitted from the LED 28 are reflected by the cut-and-erect section 263a of the sheet metal member 26a and emitted from the surface of the front case 30a of the first housing 101. The LED 28 is not a light source which emits a light beam having a high directivity. Also, since the light emitted from the LED 28 is adequately diffused in the light guide 24, a part of the light from the LED 28 is reflected by the cut-and-erect section 263a and emitted from the surface of the front case 30a of the first housing 101a as described above. However, almost the remaining light is reflected by the second surface 262a of the sheet metal member 26a toward the rear plate 21 (the surface of the rear case 25a of the first housing 101a), and then, emitted to the outside from the end region 211 of the rear plate 21.

Figure 13:
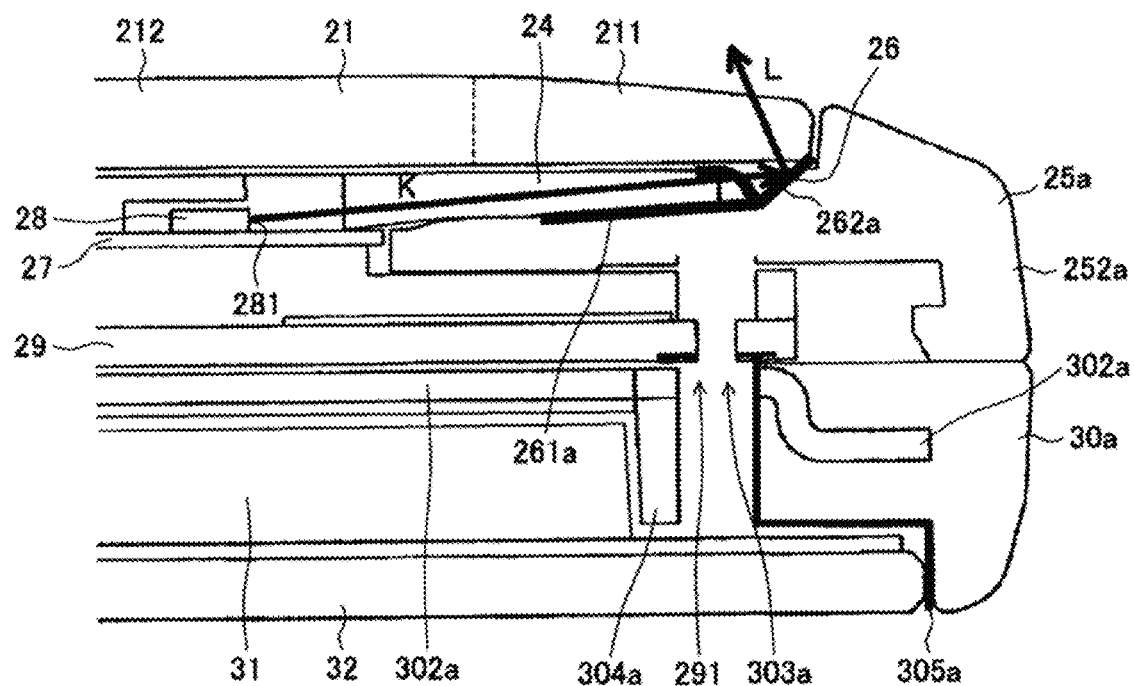
FIG. 13 illustrates how the light emitted from the LED is reflected by the second surface of the sheet metal member and emitted from the rear plate according to one embodiment.

FIG. 13 is a diagram for describing how the light emitted from the LED 28 is reflected by the second surface 262a of the sheet metal member 26a and emitted from the rear plate 21. The light emitted from the LED 28 is guided to the light guide 24 as shown by an arrow K of FIG. 13 and incident to the second surface 262a of the sheet metal member 26a. Since the second surface 262a of the sheet metal member 26a is formed to have a high reflectance as described above, the light incident to the second surface 262a is reflected along an arrow L of FIG. 13 and incident to the end region 211 of the rear plate 21. Since the end region 211 of the rear plate 21 is formed to have a high transmittance rate, the light emitted from the LED 28 is also emitted from the surface of the rear case 25a of the first housing 101a.

Figure 14:
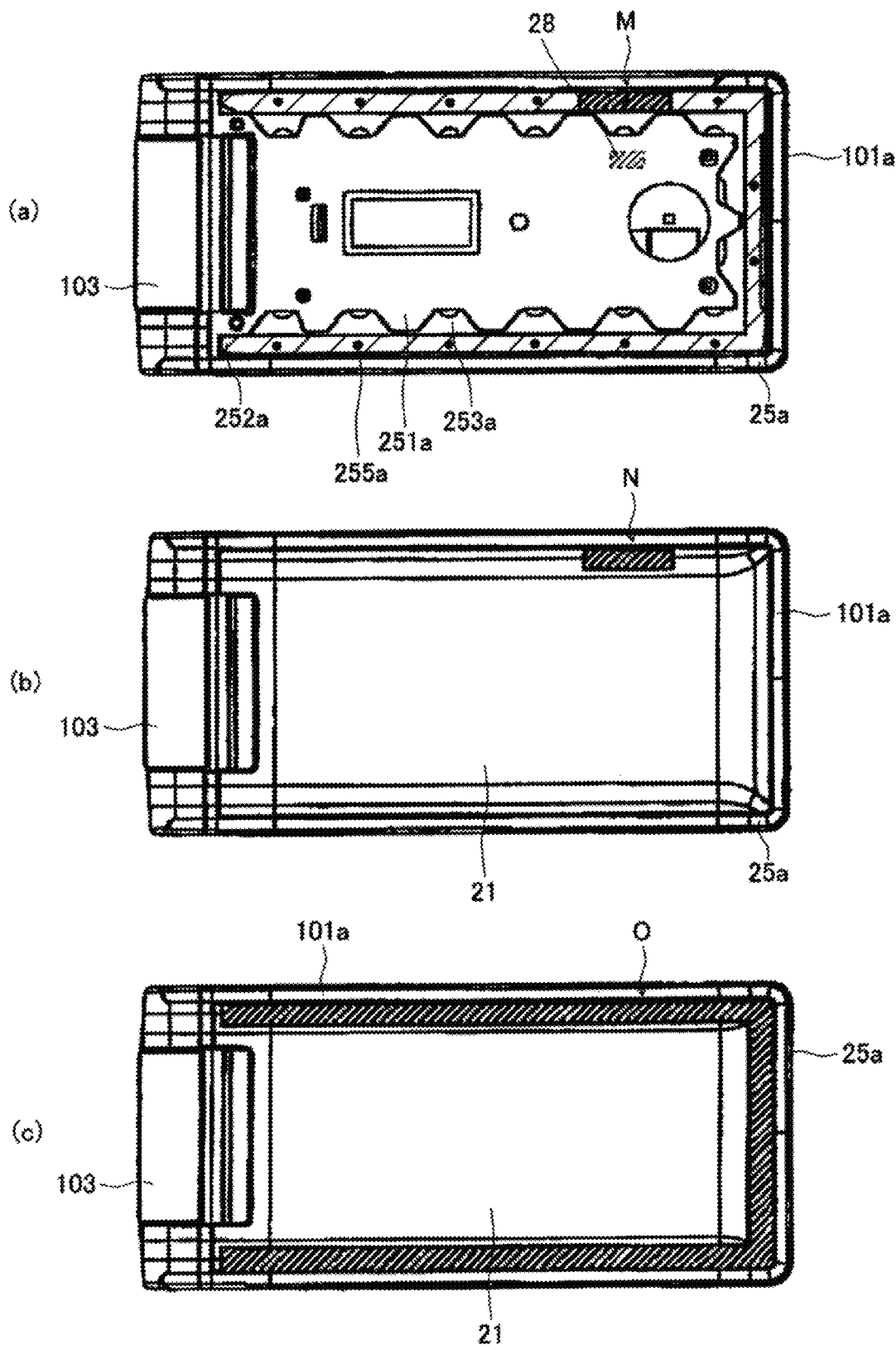
FIGS. 14A, 14B, and 14C illustrate how the light emitted from the LED and emitted to the outside of the first housing is recognized from the outside of the rear plate according to one embodiment.

FIGS. 14A, 14B, and 14C illustrate how the light emitted from the LED 28 and emitted to the outside of the first housing 101a is recognized from the outside of the rear plate 21. Specifically, FIG. 14A is a front view illustrating a rear case 25a when the light is emitted from a single LED 28 with the rear plate 21 being removed, FIG. 14B is a front view illustrating a rear case 25a when the light is emitted from a single LED 28 with the rear plate 21 being installed, and FIG. 14C is a front view illustrating a rear case 25a when the light is simultaneously emitted from a plurality of LEDs 28 with the rear plate 21 being installed.

Referring to FIG. 14A, since the opening 253a of the rear case 25a is generally formed in a radial shape with respect to the LED 28 by control operation from the controller unit of the circuit board 29, the light emitted from, for example, the LED 28 shown in FIG. 14A is diffused by the light guide 24 and the sheet metal member 26a, and as a result, an area M (filled with slash lines) of FIG. 14A appears to shine brightly as viewed from the outer front side of the rear case 25a. As to this light, when the rear plate 21 is installed, an area N (filled with slash lines) appears to shine brightly as viewed from the outer front side of rear case 25a as shown in FIG. 14B. On the other hand, as shown in FIG. 14C, when the light is simultaneously emitted from a plurality of LEDs 28 by control operation from the controller unit of the circuit board 29, the light emitted from each LED 28 are overlapped to each other. As a result, an area O (filled with slash lines), i.e., the entire area of the end region 211 of the rear plate 21, appears to shine brightly as viewed from the outer front side of the rear case 25a.

In addition, the center region 212 of the rear plate 21 is made of a material having a low light transmittance rate (e.g., a member colored by a black color group having a low light transmittance rate) to block the light from the LED 28. In addition, the double-sided adhesive tape 22 attached to it is also made of a member having a low light transmittance rate (e.g., a member colored by a black color group) to block the light from LED 28. On the other hand, the double-sided adhesive tape 23 attached to the end region 211 of the rear plate 21 is made of a member having a high light transmittance rate (e.g., a transparent or semitransparent member) to transmit light.

The light emitted from the irradiation surface 281 of the LEDs 28 includes the light directly emitted to the outside of the first housing 101 without passing through the light guide 24 or the light emitted to the inside of the first housing 101 in addition to the light incident to the light guide 24. However, since the light directly emitted to the outside of the first housing 101*a* from the LEDs 28 is incident to the center region 212 of the rear plate 21 and the double-sided adhesive tape 22 made of a material having a low light transmittance rate, most of the light is blocked. In addition, the light emitted to the inside of the first housing 101*a* from the LED 28 is blocked by the flexible substrate 27 or the circuit board 29, and no light propagates to the surface of the liquid crystal display unit of the first housing 101*a*.

The mobile terminal 100*a* according to an embodiment is constructed such that the light emitted from the LEDs 28 includes the light reflected by the end region of the rear plate 21 and emitted from the surface of the front case 30*a* of the first housing 101 as shown by an arrow H and the light reflected by the sheet metal member 26*a* and efficiently emitted from the surface of the rear case 25*a* of the first housing 101 to the outside as shown in by arrow L.

In addition, as shown in FIGS. 11 and 13, the front case 30*a* has a sheet metal member 302*a*. The sheet metal member 302*a* is a member made of a conductive metallic plate and reinforces the front case 30*a* and eventually the first housing O1a. In addition, the sheet metal member 302*a* has an opening 303*a* in combination with the opening 301*a* of the front case 30*a* as shown in FIG. 11. The sheet metal member 302*a* also has an extension 304*a* vertically extended from the opening 303*a* to reinforce the opening 301*a* and the first housing 101*a* in a thickness direction. The extension 304*a* is also made of a material similar to that of the sheet metal member 302*a*. The sheet metal member 302*a* is connected to the ground pattern of the circuit board 29 near the opening 303*a* to provide a reference voltage. This may serve as an electrostatic solution for protecting the circuit board 29 from electric or magnetic influences from any external unit or the liquid crystal display module 31.

Also, as shown in FIGS. 11 and 13, the electrostatic protection member 305*a* having conductivity may be arranged along the side face of the end of the opening 301*a*. The electrostatic protection member 305*a* is a conductive member such as a metallic plate or a metallic foil, and is arranged to cover the side face of the end of the opening 301*a* from the opening 301*a* of the front case 30*a* to a jointing portion between the front case 30*a* and the liquid crystal protection plate 32. As a result, it is possible to improve and upgrade the electrostatic protection for the first housing 101*a* in the front case 30*a*.

As shown in FIGS. 11 and 13, the light guide 24 is supported by the first surface 261*a* and the cut-and-erect section 263*a* of the sheet metal member 26*a*. This will ensure to rigidly hold the light guide 24 as well as improve its strength.

As described above, in the mobile terminal 100*a* according to an embodiment, the light emitted from the LED 28 arrives at the sheet metal member 26 disposed in the opening 253 opened in the rear case 25 via the light guide 24, and a part of the light is reflected by the cut-and-erect section 263*a* to be directed to the front case 30*a*. Therefore, the light is emitted to the outside from the opening 291 opened in the circuit board 29 and the opening 301*a* opened in the front case 30*a* via the surface of the front case 30*a* of the first housing 101*a* (the surface of the liquid crystal display unit). At the same time, the light arriving at the sheet metal member 26*a* is reflected to the rear plate 21 by the second surface 262*a* which is bent in a predetermined angle with respect to the first surface parallel to the width direction of the first housing 101*a*, and then, emitted to the outside from the end region 211 of the rear plate 21. Therefore, in the mobile terminal 100*a* according to the present embodiment, both of the end region 211 of the rear plate 21 of the rear case and the region around the liquid crystal display unit of the front case can shine brightly using the light emitted from the same LED 28. For this reason, it is possible to make two surfaces of the first housing 101*a* shine brightly without increasing the number of components or increasing the thickness of the first housing 101*a*. Since the sheet metal member 26*a* is made of a metallic member having a high reflectance and a high diffusion rate, it is possible to efficiently reflect the light emitted from the LED 28.

In the mobile terminal 100*a* according to the present embodiment, since the sheet metal member 26*a* having a high rigidity level is disposed in the end region 252*a* of the rear case 25*a*, it is possible to reinforce the first housing 101*a* by the sheet metal member 26*a* although the number of the openings 253*a* is equal to the number of the LEDs 28 in the rear case 25*a*. Since a metal member generally becomes strong in a bent area, the sheet metal member 26*a* has the first surface 261*a* parallel to the width direction of the first housing 101*a* as well as the second surface 262*a* bent in a predetermined angle with respect to the first surface 261*a*. Therefore, it is possible to reinforce the sheet metal member 26*a*, and also possible to improve rigidity of the first housing 101*a*. In addition, in the mobile terminal 100*a* according to the present embodiment, since the sheet metal member 26*a* is electrically connected to the ground pattern of the circuit board 29 and serves as a reference voltage, it is possible to remove electric and magnetic noises around the opening 253*a* which has been known to be susceptible to noises.

In the mobile terminal 100 according to the present embodiment, the front case 30*a* includes a sheet metal member 302*a*. In order to direct the light reflected by the cut-and-erect section 263*a* of the sheet metal member 26*a* toward the surface of the front case 30*a*, the sheet metal member 302*a* also has an opening 303*a* located correspondingly to the opening 301*a* of the front case 30*a*. Therefore, it is possible to use the sheet metal member 302*a* to improve the strength of the first housing 101*a* without blocking the light.

Furthermore, in the mobile terminal 100 according to the present embodiment, the sheet metal member 26 is connected to the ground pattern of the circuit board 29 to serve as a reference voltage. In addition, the sheet metal member 302*a* is connected to the ground pattern mounted on the circuit board 29 by way of the electrostatic protection member 305*a* to serve as a reference voltage. As a result, it is possible to electrically and magnetically protect the first housing 101 from external influences.

Hereinafter, a mobile terminal 100 according to another embodiment will be described.

FIGS. 15A and 15B are diagrams illustrating an example of the appearance of a mobile terminal 100 according to an embodiment. Specifically, FIG. 15A illustrates an unfolded state (i.e., opened state) of the mobile terminal 100, and FIG. 15B illustrates a folded state (i.e., closed state) of the mobile terminal 100. Referring to FIGS. 15A and 15B, the mobile terminal 100 includes a display unit 10, a first housing 101 provided with a display unit 10 and a speaker 11, and a second housing 102 provided with an operation unit 12 and a microphone 13. The first and second housings 1 and 102 are coupled to each other by way of a hinge 103. The hinge 103 has a hinge mechanism for allowing the first and second housings 101 and 102 to be pivoted against each other. The hinge 103 allows the first and second housings 101 and 102 to transition between the unfolded and folded states shown in FIGS. 15A and 15B, respectively, of the mobile terminal 100. Furthermore, the first housing 101 has a light-emitting construction for allowing at least a part of the exposed surface to emit a light.

Now, construction of the exemplary first housing 101 will be described.

Figure 16:
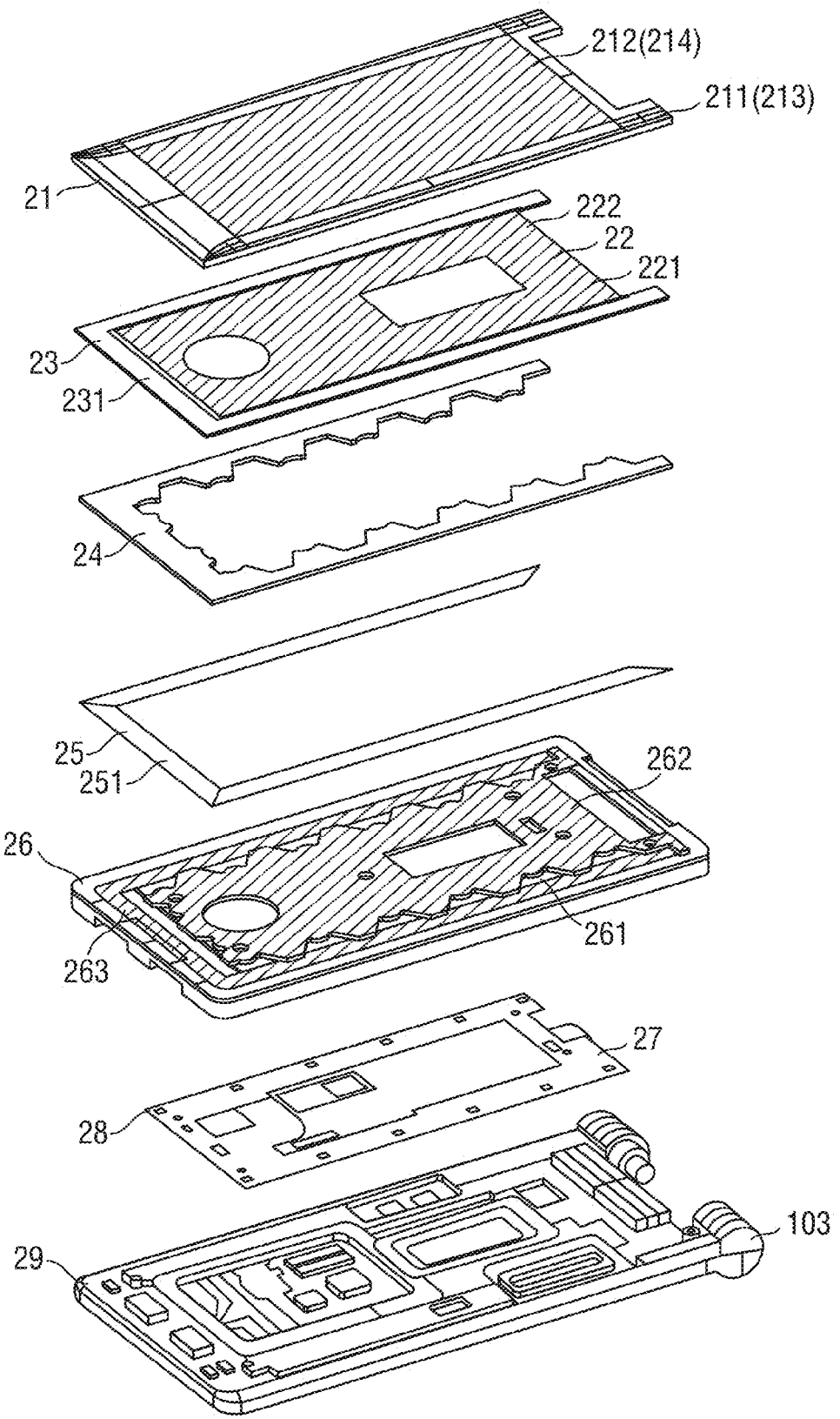
FIG. 16 is an exploded perspective view illustrating a light-emitting construction of a first housing, according to one embodiment.

FIG. 16 is an exploded perspective view illustrating the first housing 101. In FIG. 16, a reference numeral 21 denotes a face outwardly exposed when the mobile terminal 100 is in a closed state, and a reference numeral 29 denotes a face obstructed by the second housing 102 when the mobile terminal 100 is in a closed state.

Referring to FIG. 16, the first housing 101 has a stack structure including a rear plate 21 (corresponding to a case member of the claim), a double-sided adhesive tape 22 (corresponding to a first double-sided adhesive member of the claim), a double-sided adhesive tape 23 (corresponding to a second double-sided adhesive member of the claim), a light guide 24 (corresponding to the first light guide of the claim), a double-sided adhesive tape 25 (corresponding to the first light reflector of the claim), a rear case 26, a flexible substrate 27 (corresponding to a circuit board of the claim) having an LED (Light Emitting Diode) 28 (corresponding to a light source of the claim), and a front case 29. A combination of the rear case 26 and the flexible substrate 27 corresponds to the first base of the claim. In addition, while inside the first housing 101, various components such as electronic components for controlling operation of a display unit 10 or a speaker 11 are interposed between the rear and front case 26 and 29 (more specifically, between the flexible substrate 27 and the front case 29), description of these components will be omitted in the present embodiment.

The rear plate 21 is a plate member made of, for example, reinforced glass or resin. The rear plate 21 is outwardly exposed for the closed state of the mobile terminal 100 and attached to the rear case 26 by way of the double-sided adhesive tape 22 and 23 to provide a main surface of the first housing 101. In addition, according to the present embodiment, an end region 211 (corresponding to the first light transmission part of the claim) and a center region 212 (corresponding to the first light blocking part of the claim) are separately provided in the rear plate 21. The double-sided adhesive tape 22 is provided such that an outer face of the first housing 101 is attached to the center region 212 of the rear plate 21, and an inner face of the first housing 101 is attached to the center region 262 of the rear case 26. In addition, the shape and size of the double-sided adhesive tape 22 are substantially equal to those of the center region 212 of the rear plate 21.

Similarly, the double-sided adhesive tape 23 is provided such that an outer face of the first housing 101 is attached to the end region 211 of the rear plate 21, and the inner face of the first housing 101 is attached to the light guide 24. Also, the shape and size of the double-sided adhesive tape 23 are substantially equal to those of the end region 211 of the rear plate 21.

The light guide 24 is an optical diffusion member made of a transparent member or resin having a high optical diffusion rate such as polycarbonate. The light guide 24 is arranged in the rear case 26 by attaching the outer face of the first housing 101 using the double-sided adhesive tape 23 and attaching the inner face of the first housing 101 using the double-sided adhesive tape 25. Since the light guide 24 is arranged in the rear case 26 to face the LED 28 in a width direction of the first housing 101, the light guide 24 is interposed between the LED 28 and the double-sided adhesive tape 25. In addition, the size of the light guide 24 is substantially equal to that of end region 211 of the rear plate 21.

The double-sided adhesive tape 25 is provided such that the outer surface of the first housing 101 is attached to the light guide 24, and the inner surface of the first housing 101 is attached to the end region of the rear case 26. In addition, the shape and size of the double-sided adhesive tape 25 is substantially equal to those of the end region 211 of the rear plate 21.

The rear case 26 is a case structure made of resin or the like and fitted into the edges of the front case 29 to provide appearance of the first housing 101. In addition, the rear case 26 has a plurality of openings 261 to separate a center region 262 and an end region 263 from each other.

FIGS. 17A, 17B and 17C are diagrams for describing a shape of the rear case 26.

FIG. 17A is a front view illustrating the rear case 26 as viewed from outer front side of the first housing 101. Referring to FIG. 17A, the rear case 26 has a plurality of openings 261 (corresponding to the opening of the claim), a center region 262, an end region 263, and a tape adhesion section 264.

A plurality of openings 261 opened in the rear case 26 are holes for transmitting the light emitted from the LEDs 28. The number of the openings 261 provided in the rear case 26 is set to be equal to the number of the LEDs 28. As shown in FIG. 17A, the openings 261 generally have a trapezoidal shape as viewed from the outer front face of the first housing 101. The side face of the trapezoidal shape has an inclination part 2611 inclined to the width direction of the first housing 11. The inclination part 2611 serves as a light guide 2612 for guiding the light emitted from the LEDs 28 which will be described later. The light guide 2612 is a guide section for guiding the light along the inclination part 2611 of the trapezoid of the opening 261. FIG. 17B is a width cross-sectional view illustrating a rear case 26 along a line A-A' of FIG. 17A. As shown in FIG. 17B, the openings 261 are opened between the end region 263 and the center region 262 of the rear case 26.

The center region 262 is a member constructed near a center area of the rear case 26, and is constituted as a light blocking part 265 for blocking the light emitted from the LEDs 28 to prevent leakage from areas other than the openings 261. The center region 262 has a step structure which is higher than the end region 263 which will be described later. FIG. 17C is a cross-sectional view along a line B-B' of FIG. 17A, which is also a width cross-sectional view illustrating the first housing 101 of the rear case 26 in a location where the openings 261 are not provided. As shown in FIG. 17C, the rear case 26 is obtained by coupling the center region 262 and the end region 263 to each other. As shown in FIGS. 17A to 17C, the end region 263 forms an edge (i.e., end) area of the rear case 26. Since the center region 262 and the end region 263 are coupled to each other, the light blocking part 265 constructed by the center region 262 is terminated such that the light emitted from the LEDs 28 is not leaked from an area other than the openings 261.

A tape adhesion section 264 is a space for attaching the double-sided adhesive tape 25, and is provided in a concave area of the end region 263 of the rear case 26. The tape adhesion section 264 extends from the edges of the rear case 26 to the center area as shown in FIG. 17B and has an inclination surface inclined to the thickness direction of the first housing 101 in order to allow the attached double-sided adhesive tape 25 to efficiently reflect and diffuse the light emitted from the LEDs 28 to the thickness direction of the first housing 101. The tape adhesion section 264 may have any inclination angle if it can efficiently reflect and diffuse the light from the LEDs 28 to the thickness direction of the first housing 101, and it is not particularly limited to the present embodiment. In addition, since the light guide 24 is also attached to the double-sided adhesive tape 25 attached to the tape adhesion section 264, the light guide 24 is overlaid on the tape adhesion section 264.

The flexible substrate 27 is a circuit board for performing various kinds of control operation in response to control of a controller unit (not shown in FIG. 16). According to the present embodiment, since a plurality of LEDs 28 are mounted on an outer face of the first housing 101, the flexible substrate 27 has a circuit for transmitting control signals from the controller unit to each LED 28. Therefore, the flexible substrate 27 is internally arranged in the first housing 101 such that each of the LEDs 28 corresponds to each of the openings 261 of the rear case 26. Further, the controller unit of the flexible substrate 27 is adapted to allow a part of the LEDs 28 as well as all of the LEDs 28 to be partly or simultaneously turned on. The LEDs 28 are constructed of light-emitting diodes or the like to serve as a light source.

Figure 18:
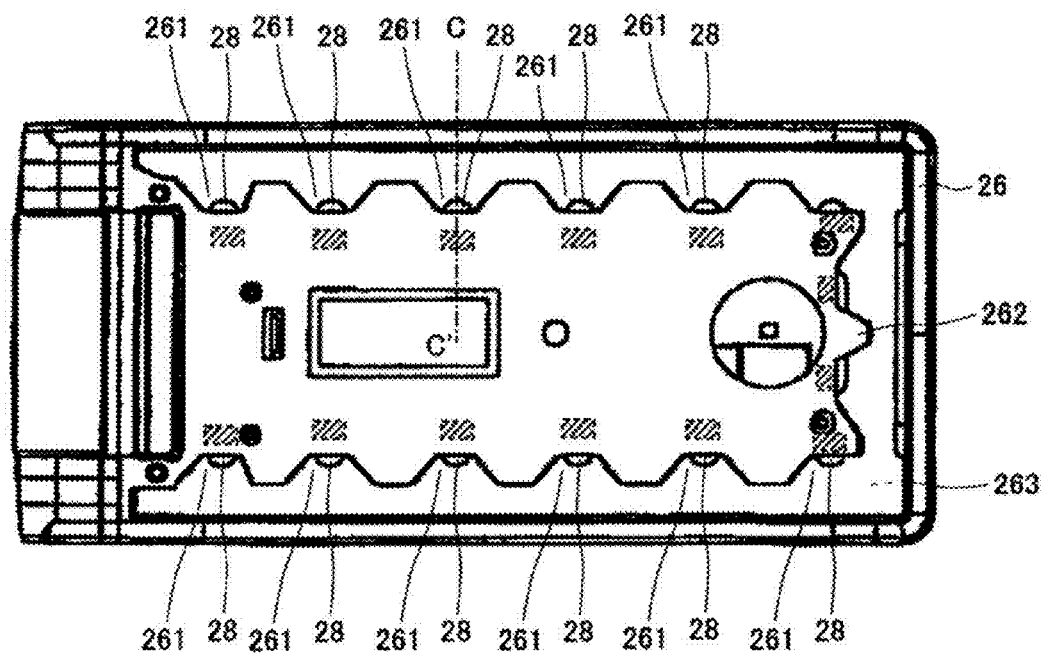
FIG. 18 illustrates how the openings and a plurality of the LEDs mounted on the flexible substrate are arranged correspondingly to each other as viewed from an outer front face of the first housing of the rear case, according to one embodiment.

FIG. 18 is a diagram illustrating how a plurality of the LEDs 28 mounted on the flexible substrate 27 are arranged correspondingly to the openings 261 as viewed from an outer front face of the first housing 101 of the rear case 26. In addition, since the LEDs 28 are disposed in an inside of the center region 262 of the rear case 26, it is difficult to recognize the LEDs 28 as the rear case 26 is viewed from an outer front face of the first housing 101. Accordingly, in FIG. 17, the LEDs 28 are illustrated as boxes surrounded by dotted lines.

Figure 19:
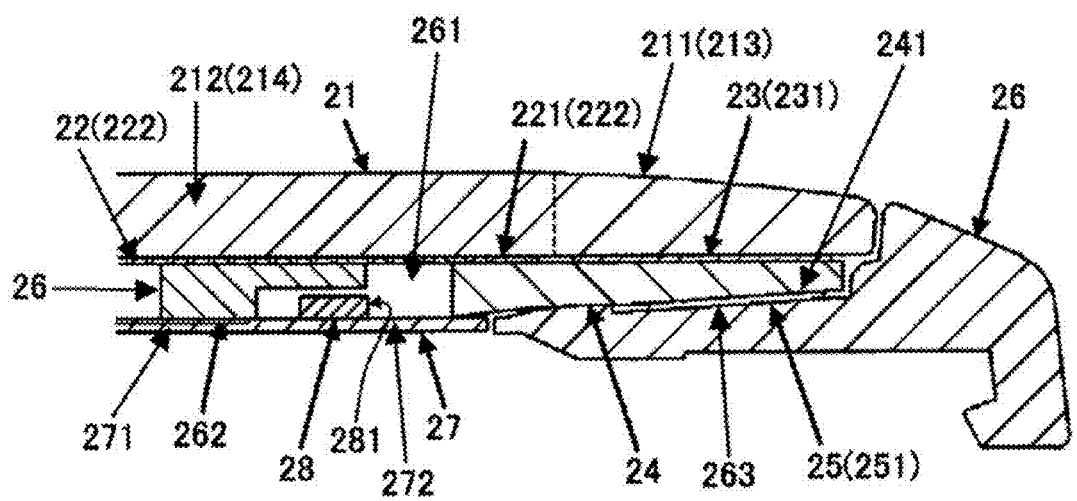
FIG. 19 is a cross-sectional view along a line C-C' of FIG. 18.

FIG. 19 is a cross-sectional view along a line C-C' of FIG. 18. Referring to FIG. 19, the light guide 24 is arranged on an outer face of the first housing 101 in the end region 263 of the rear case 26 by way of the double-sided adhesive tape 25. In addition, since the light guide 24 formed on the inner face of the first housing 101 has an inclination surface 241 inclined toward the end region 211 of the rear plate 21, the outer face of the first housing 101 in the end region 263 of the rear case 26 where the double-sided adhesive tape 25 is attached is also inclined in response to this inclination surface 241.

In addition, the double-sided adhesive tape 25 is made of a material having a high diffusion rate and a high reflectance (e.g., a material colored by a white color) to provide an optical diffusion section 251. The rear plate 21 is installed on the outer face of the first housing 101 in the rear case 26 by way of the double-sided adhesive tapes 22 and 23. That is, the rear plate 21 is installed on the outer face of the first housing 101 in the rear case 26 by attaching the center region 212 to the center region 262 of the rear case 26 and to the double-sided adhesive tape 22 having a first extension part 221 extended to the opening 261 and attaching the end region 211 to the double-sided adhesive tape 23 which is also attached to the outer face of the first housing 101 in the light guide 24.

In addition, the center region 212 of the rear plate 21 is made of a material having a low light transmittance rate (e.g., a material colored by a black color group having a low light transmittance rate) to provide a light blocking part 214. Accordingly, the double-sided adhesive tape 22 attached to it is also made of a material having a low light transmittance rate (e.g., a material colored by a black color group) to provide a light blocking part 222 (corresponding to the second light blocking part of the claim). On the other hand, the end region 211 of the rear plate 21 is made of a material having a high light transmittance rate (e.g., a transparent or semitransparent material) to provide an light transmission part 213. Also, the double-sided adhesive tape 23 attached to the end region 211 is also made of a material having a high light transmittance rate (e.g., a transparent or semitransparent material) to provide an light transmission part 231 (corresponding to the second light transmission part of the claim).

On the other hand, the flexible substrate 27 is arranged inside the rear case 26 to provide a facing section 271 opposite to the inner face of the first housing 101 in the center region of the rear case 26, and a second extension 272 extended to the opening 261 formed in the rear case 26. In addition, LEDs 28 are mounted on an outer face of the first housing 1 in the second extension 272. Specifically, the LEDs 28 are mounted on the second extension 272 of the flexible substrate 27 such that the light irradiation surface 281 where the light is practically emitted is directed in a width direction of the first housing 101, i.e., toward the end region 263 from the center region 262 of the rear case 26.

Figure 20:
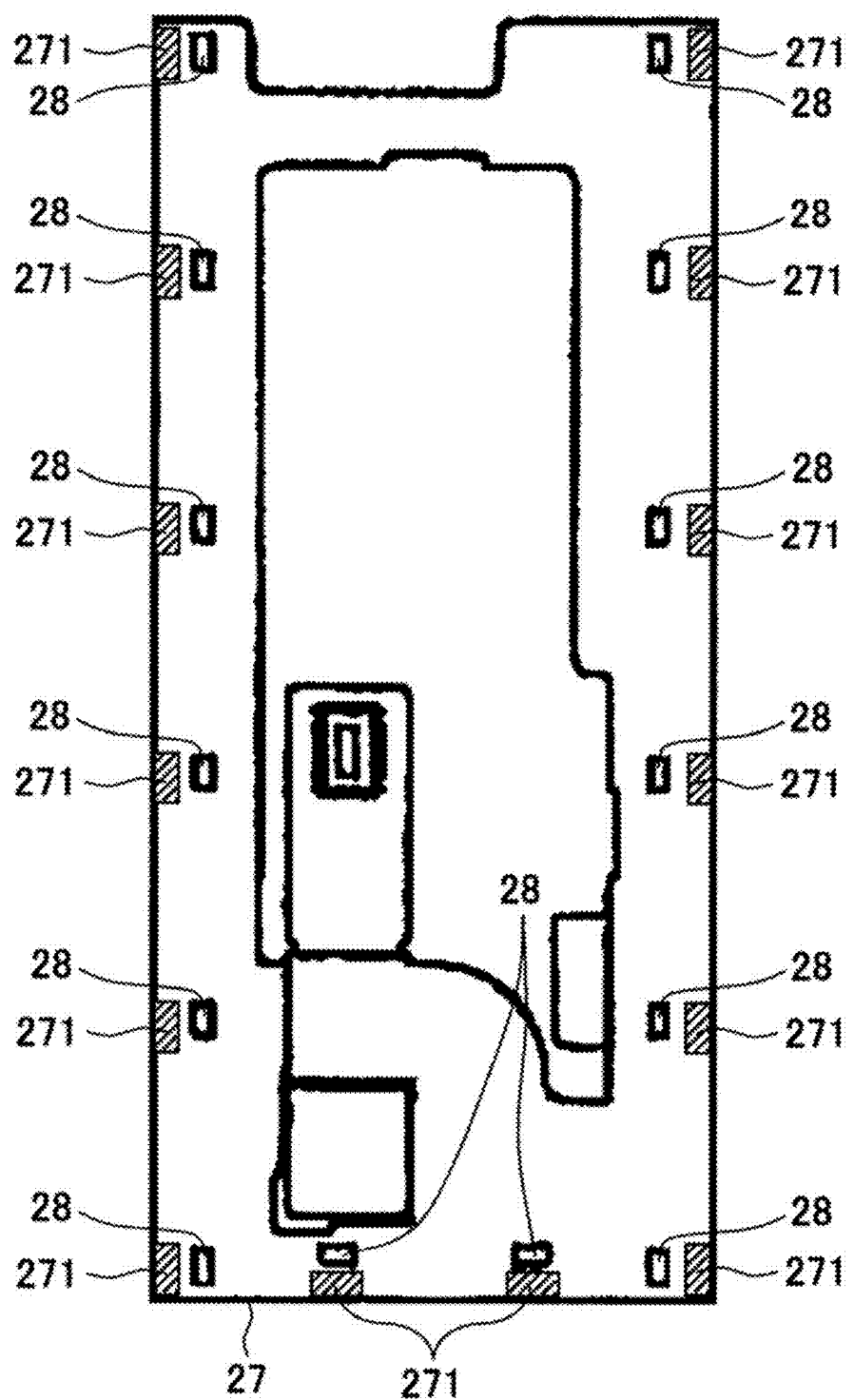
FIG. 20 illustrates the flexible substrate having a plurality of LEDs as viewed from the outer front face of the first housing, according to one embodiment.

Now, the flexible substrate 27 will be described in more detail with reference to FIG. 20. FIG. 20 is a diagram illustrating the flexible substrate 27 having a plurality of LEDs 28 as viewed from the outer front face of the first housing 101. Referring to FIG. 20, a ground pattern 273 (corresponding to the second light reflector of the claim) is provided in an area of the second extension 272 of the flexible substrate 27 in association with the LEDs 28 as a noise protection means around the flexible substrate 27. The ground pattern 273 is made of a glossy metallic material having a high optical diffusion rate and a high reflectance, such as copper. The ground pattern 273 is electrically connected to a reference voltage. Furthermore, although not shown in the drawing, the ground pattern 273 makes contact with the inner face of the first housing 101 in the light guide 24 when it is installed in the first housing 101.

Figure 21:
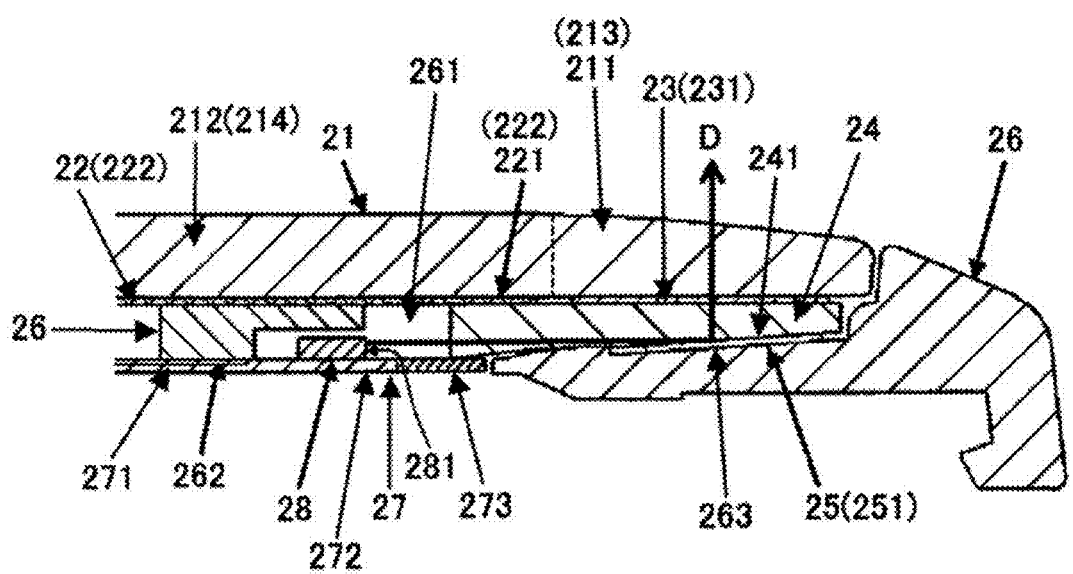
FIG. 21 illustrates a path for passing the light emitted from the LED, according to one embodiment.

Now, a path through which the light emitted from the LEDs 28 passes will be described with reference to FIG. 21. Similarly to FIG. 19, FIG. 21 is a cross-sectional view along a line C-C' of FIG. 18. Referring to FIG. 21, since the irradiation surface 281 of the LED 28 is mounted on the second extension 272 of the flexible substrate 27 toward the width direction of the first housing 101, the light emitted from the LED 28 is efficiently incident to the light guide 24 opposite to the irradiation surface 281 of the LED 28. The light incident to the light guide 24 reaches the optical diffusion section 251 of the double-sided adhesive tape 25 while being diffused in the light guide 24, it reaches. Particularly, since the light guide 24 has an inclination surface 241 on its inner face against the first housing 101 attached by way of the double-sided adhesive tape 25, the light incident to the light guide 24 is efficiently guided to the optical diffusion section 251 of the double-sided adhesive tape 25 and the end region 211 of the rear plate 21.

Since the optical diffusion section 251 is made of a material having a high optical diffusion rate and a high reflectance, the light incident to the double-sided adhesive tape 25 via the light guide 24 is further diffused and reflected by the optical diffusion section 251 toward the light transmission part 213 of the rear plate 21, and then incident back to the light guide 24 in a thickness direction of the first housing 101. Subsequently, the light incident back to the light guide 24 is guided to the outside of the first housing 101, and then, incident to the light transmission part 231 of the double-sided adhesive tape 23. Since the light transmission part 231 is made of a material having a high light transmittance rate as described above, most of the incident light is not blocked but incident to the light transmission part 213 of the rear plate 21. Since the light transmission part 213 of the rear plate 21 is also made of a material having a high light transmittance rate similarly to the light transmission part 231 of the double-sided adhesive tape 23, most of the light incident to the light transmission part 213 is not blocked and emitted to the outside of the first housing 101.

On the other hand, the light emitted from the irradiation surface 281 of the LEDs 28 includes the light directly emitted to the outside of the first housing 101 without passing through the light guide 24 or the light emitted to the inside of the first housing 101 in addition to the light incident to the light guide 24. However, since the light directly emitted to the outside of the first housing 101 from the LEDs 28 is incident to the rear plate 21 and the double-sided adhesive tape 22 made of a material having a low light transmittance rate, most of the light is blocked by the double-sided adhesive tape 22 and the rear plate 21. In addition, the light directly emitted to the inside of the first housing 101 from the LEDs 28 is incident to the second extension 272 of the flexible substrate 27, and the second extension 272 has a ground pattern 273 having a high optical diffusion rate and a high optical reflectance. Therefore, the light incident to the second extension 27 of the flexible substrate 272 is diffused and reflected by the ground pattern 273 toward the light guide 24, and then, emitted to the outside of the first housing 101 via the same path as that of the light directly incident to the light guide 24 from the LEDs 28. Furthermore, since the ground pattern 273 and the light guide 24 make contact with each other, the light diffused and reflected by the ground pattern 273 toward the light guide 24 is efficiently incident to the light guide 24. In summary, the light emitted from the LEDs 28 is efficiently emitted to the outside of the first housing 101 via a path including the light guide 24, the double-sided adhesive tape 25, the light guide 24, the double-sided adhesive tape 23, and the light transmission part 213 of the rear plate 21 as shown by an arrow D.

Figure 22:
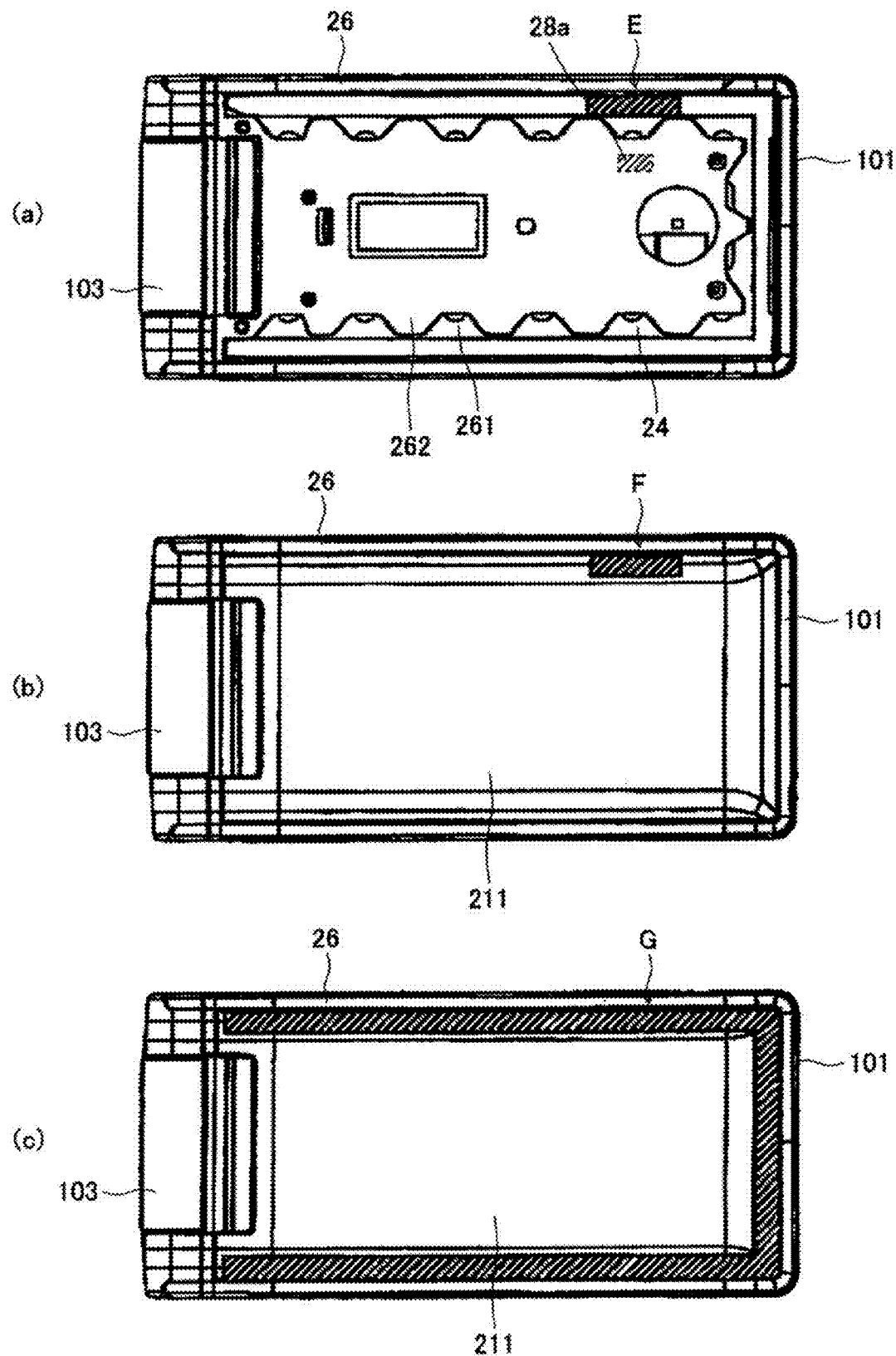
FIGS. 22A, 22B, and 22C illustrate how the light emitted from the LEDs to the outside of the first housing is recognized from the outside, according to one embodiment.

FIGS. 22A, 22B, and 22C illustrate how the light emitted from the LEDs 28 and emitted to the outside of the first housing 101 is recognized from the outside. Specifically, FIG. 22A is a front view illustrating a rear case 26 when the light is emitted from a single LED 28 with the rear plate 21 being removed, FIG. 22B is a front view illustrating a rear case 26 when the light is emitted from a single LED 28 with the rear plate 21 being installed, and FIG. 22C is a front view illustrating a rear case 26 when the light is simultaneously emitted from a plurality of LEDs 28 with the rear plate 21 being installed.

Referring to FIG. 22A, since the opening 261 of the rear case 26 is generally formed in a radial shape with respect to the LED 28 by control operation from the controller unit of the flexible substrate 27, the light emitted from, for example, the LED 28a shown in FIG. 22A is diffused in a radial shape by the light guide 24 and the optical diffusion section 251. As a result, an area E (filled with slash lines) of FIG. 22A appears to shine brightly from the outer front side of the rear case 26. As to this light, when the rear plate 21 is installed, an area F (filled with slash lines) appears to shine brightly from the outer front side of the rear case 26 as shown in FIG. 22B. On the other hand, as shown in FIG. 22C, when the light is simultaneously emitted from a plurality of LEDs 28 by control operation from the controller unit of the flexible substrate 27, the light emitted from each LED 28 are overlapped to each other. As a result, an area G (filled with slash lines), i.e., the entire area of the light transmission part 213, appears to shine brightly from the outer front side of the rear case 26.

As described above, in the mobile terminal 100 according to the present embodiment, the light emitted from the LED 28 is efficiently incident to the light guide 24 facing the irradiation surface 281 of the LED 28, and the light incident to the light guide 24 is guided to the optical diffusion section 251 of the double-sided adhesive tape 25 while being diffused in the light guide 24. The light incident to the double-sided adhesive tape 25 is further diffused and reflected by the optical diffusion section 251 having a high diffusion rate and a high reflectance toward the light transmission part 213 of the rear plate 21, incident back to the light guide 24 in a thickness direction of the first housing 101, and then, incident to the light transmission part 231 of the double-sided adhesive tape 23. Most of the light incident to the light transmission part 231 passes through the light transmission parts 231 and 213 made of a material having a high optical transmittance rate without being blocked, and then emitted to the outside of the first housing 11. That is, in the mobile terminal 100 according to the present embodiment, since the light from the LED 28 is reflected and diffused by the optical diffusion section 251 and incident to the light transmission part 213, there is no need to arrange the LEDs 28 correspondingly to the light transmission part 213. Therefore, it is possible to improve design freedom of the light-emitting structure in the first housing 101 as well as provide an efficient structure.

In addition, in the mobile terminal 100 according to the present embodiment, the double-sided adhesive tape 25 is made of a material having a high optical diffusion rate and a high optical reflectance (e.g., a material colored by a white color group) to provide an optical diffusion section 251. The double-sided adhesive tape 22 attached to the center region 212 of the rear plate 21 is made of a material having a low optical transmittance rate (e.g., a material colored by a black color group) to provide a light blocking part 222. Furthermore, the double-sided adhesive tape 22 attached to the end region 211 of the rear plate 21 is made of a material having a high optical transmittance rate (e.g., a transparent or semi-transparent material) to provide an light transmission part 231. As a result, since the optical diffusion section 251, the light transmission part 231, and the light blocking part 222 are integrated in a single body with the double-sided adhesive tapes 25, 23, and 22 for attaching each light-emitting component, it is possible to reduce the number of light-emitting components.

In addition, in the mobile terminal 100 according to the present embodiment, the light directly emitted to the outside of the first housing 101 from the LED 28 is incident to the double-sided adhesive tape 22 made of a material having a low optical transmittance rate and the light blocking part 214 of the rear plate 21. Therefore, most of the light is blocked by the double-sided adhesive tape 22 and the light blocking part 214. In addition, although the light directly emitted to the inside of the first housing 101 from the LED 28 is incident to the second extension 272 in the flexible substrate 27, it is diffused and reflected to the light guide 24 because the second extension 272 has a ground pattern 273 having a high optical diffusion rate and a high reflectance. This construction allows the light emitted from the LED 28 to be efficiently incident to the light guide 24 for guiding the light to the optical diffusion section 251 of the double-sided adhesive tape 25 which reflects and diffuses the light to emit it outside the first housing 101 and prevents the light from being leaked to other unnecessary area. As a result, it is possible to efficiently emit the light from the LED 28 to the outside.

In addition, in the mobile terminal 100 according to the present embodiment, since the light guide 24 has an inclination surface 241 on its inner face of the first housing 101 attached to the double-sided adhesive tape 25, the light incident to the light guide 24 is efficiently guided to the optical diffusion section 251 of the double-sided adhesive tape 25 and the end region 211 of the rear plate 21.

In addition, in the mobile terminal 100 according to the present embodiment, the double-sided adhesive tape 22 has a first extension part 221 extended to the opening 261, and the first extension part 221 has a light blocking part 222. Therefore, it is possible to prevent undesired leakage of light from areas other than the light transmission part 231.

In addition, in the mobile terminal 100 according to the present embodiment, the flexible substrate 27 is arranged inside the rear case 26 to provide a facing section 271 opposite to the inner face of the first housing 101 in the center region of the rear case 26 and a second extension 272 extended to the opening 261 formed in the rear case 26. Since the extension has a ground pattern 273 having a high optical reflectance and a high diffusion rate, it is possible to prevent the light from the LED 28 from being downwardly leaked and to efficiently guide the light incident to the extension to the light guide 24. Since the ground pattern 273 has a reference voltage, it is possible to prevent electric and magnetic noises near the flexible substrate 27. Since the light emitted from the LED 28 in a width direction of the housing is reflected and diffused by the double-sided adhesive tape 25 in a thickness direction of the first housing 101, there is no need to arrange the LED 28 in a thickness direction of the first housing 101 against the rear plate 21, and it is possible to reduce the thickness of the first housing 101.

The invention is not limited to the aforementioned embodiments.

That is, various changes or substitutions may be made to the elements of the embodiments described above within the technical concept and scope of the invention and equivalents thereof.

For example, although, according to one embodiment, the sheet metal member 26 has the first surface 261 perpendicular to the irradiation surface 281 of the LED 28 and the second surface 262 parallel to the irradiation surface of the LED 28, the present invention is not limited thereto and the first surface 261 or the second surface 262 may have an inclination part inclined to the opening 253. This may increase the amount of light which have been emitted from the LED 28 and incident to the first or second surface 261 or 262 via the light guide 24. Also, it is possible to efficiently reflect and diffuse the light emitted from the LED 28 (particularly, the light emitted to the inside of the first housing 101).

The angle between the first surface 261 and the second surface 262 may be arbitrarily adjusted in order to regulate the amount of light that is reflected by the second surface 262 and incident to the first surface 261. Thus the unevenness of diffusion and reflection by the sheet metal member 26 can be preferably reduced.

Although the sheet metal member 26 is made of a metallic member having a plate shape, the invention is not limited thereto. Many other shapes may be available without departing from the scope of the invention.

Although, according to the aforementioned embodiments, the mobile terminal 100 is a folder-type mobile phone, the invention is not limited thereto. Many other electronic devices such as a mobile phone other than the folder-type or a personal digital assistant (PDA) may be embodied if they have a light-emitting construction.

Although, according to an embodiment, as shown in FIG. 5, the opening 253a of the rear case 25a (the first light transmission part of the invention) and the opening 301a of the front case 30a (the second light transmission part of the invention) are arranged in corresponding locations in a thickness direction of the first housing 101a, the invention is not limited thereto. That is, the location relation of the first and second light transmission parts is not limited in the invention. For example, the second light transmission part may be an opening opened to the side face of the first housing 101, and the side face of the first housing 101a or a face of the rear plate 26a may appear to because of the light emitted from the LED 28. In this case, the light may be reflected to the opening other than the first or second light transmission part by changing the inclination angle of the cut-and-erect section 263a of the sheet metal member 26a or employing a reflective metallic member.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile terminal comprising:
 a first base comprising a first light transmission part, wherein the first light transmission part is configured to transmit light from an inside to an outside of the first base along one or more portions of a perimeter region of the first base;

a light source arranged inside the first base and in a location capable of emitting the light to the outside of the first base via the first light transmission part;

a light reflector arranged outside the first base and in a location corresponding to the light transmission part adjacent the perimeter region of the first base, wherein the light reflector is configured to reflect the light such that one or more portions of the perimeter region of the mobile terminal is illuminated, and comprises a first surface substantially parallel to a planar surface of the first base and a second surface substantially perpendicular to the planar surface of the first base, so that the first surface and the second surface are configured to be an L-shape; and a light blocking part arranged inside the first base near a center area of the first base, wherein the light blocking part prevents the light from the light source from being transmitted outside of the first base except along the perimeter region of the first base.

2. The mobile terminal according to claim 1, wherein the light reflector comprises a conductive member, wherein the conductive member is electrically connected to a reference voltage.

3. The mobile terminal according to claim 1, wherein the light reflector comprises a metal member.

4. The mobile terminal according to claim 1, further comprising a light guide in at least a part of an area extended from the light source to the light reflector.

5. The mobile terminal according to claim 4, wherein the light reflector connects to the light guide.

6. The mobile terminal according to claim 1, wherein
the light reflector is configured to direct the light, which is emitted from the light source, from a direction parallel to a surface of the first base to a direction perpendicular to the surface of the first base.

7. The mobile terminal according to claim 1, wherein the first surface is substantially perpendicular to a light-emitting surface of the light source and the second surface is substantially parallel to the light-emitting surface of the light source.

8. The mobile terminal according to claim 7, wherein the first or second surface of the light reflector comprises an inclination part inclined toward the first light transmission part.

9. The mobile terminal according to claim 1, wherein the first or second surface of the light reflector comprises an inclination part inclined toward the first light transmission part.

10. The mobile terminal according to claim 1, further comprising a second base connected to the first base,
wherein the second base comprises a second light transmission part in an area corresponding to the light reflector.

11. The mobile terminal according to claim 1, further comprising a circuit board on the first base,
wherein the circuit board comprises a third light transmission part opposite to the first light transmission part, and a reference voltage part electrically connected to a reference voltage arranged around the third light transmission part.

12. The mobile terminal according to claim 1, wherein the first light transmission part is an opening of the base.

13. The mobile terminal according to claim 1, wherein the first base comprises a plurality of openings arranged along the one or more portions of the perimeter of the first base, and the light source comprises a plurality of light emitting diodes (LED's) arranged within the first base to radiate light through a corresponding one of the plurality of openings.

14. The mobile terminal according to claim 13 further comprising a controller coupled to the plurality of LED's, wherein the controller is configured to turn on each of the plurality of LED's individually or two or more of the plurality of LED's simultaneously.

15. A mobile terminal, comprising:
a housing;
a plurality of light emitting elements contained within the housing;
a light reflector arranged within the housing and configured to reflect the light generated by the plurality of light emitting elements, wherein the light reflector comprises a first surface substantially parallel to a planar surface of the housing and a second surface substantially perpendicular to the planar surface of the housing, so that the first surface and the second surface are configured to be an L-shape; and
a light guide contained within the housing and arranged along a perimeter area of the housing, the light guide comprising a plurality of protrusions that protrude inwardly toward a center of the housing, wherein each of the plurality of protrusions is positioned adjacent to a corresponding one of the plurality of light emitting elements to allow light from a respective corresponding light element to be diffused by a respective corresponding protrusion and illuminate a corresponding portion of a perimeter area of an external surface of the housing.

16. The mobile terminal of claim 15 further comprising a lighting blocking element located near a center area of the housing, wherein the light blocking element blocks light from being transmitted to a center area of the external surface of the housing while allowing light to be transmitted to the perimeter area of the external surface of the housing.

17. The mobile terminal of claim 15 wherein when all of the plurality of light emitting elements are illuminated, the perimeter area of the external surface of the housing is illuminated to provide a U-shaped illumination area.

* * * * *